(12) United States Patent
Bhushan et al.

(10) Patent No.: US 6,813,628 B2
(45) Date of Patent: Nov. 2, 2004

(54) METHOD AND APPARATUS FOR PERFORMING EQUALITY COMPARISON IN REDUNDANT FORM ARITHMETIC

(75) Inventors: Bharat Bhushan, Cupertino, CA (US); Edward Grochowski, San Jose, CA (US); Vinod Sharma, Sunnyvale, CA (US); John Crawford, Saratoga, CA (US)

(73) Assignee: Intel Corporation, Santa Clara, CA (US)

(*) Notice: Subject to any disclaimer, the term of this patent is extended or adjusted under 35 U.S.C. 154(b) by 405 days.

(21) Appl. No.: 09/746,771

(22) Filed: Dec. 22, 2000

(65) Prior Publication Data

US 2002/0174157 A1 Nov. 21, 2002

Related U.S. Application Data

(60) Provisional application No. 60/171,872, filed on Dec. 23, 1999, and provisional application No. 60/171,863, filed on Dec. 23, 1999.

(51) Int. Cl.[7] .................................................. G06F 7/04
(52) U.S. Cl. ...................................... 708/671; 708/200
(58) Field of Search ................................ 708/671, 200

(56) References Cited

U.S. PATENT DOCUMENTS

| | | | |
|---|---|---|---|
| 3,935,438 A | 1/1976 | Grupe | 235/174 |
| 4,422,143 A | 12/1983 | Guttag | 364/200 |
| 4,709,226 A | 11/1987 | Christopher | 340/347 DD |
| 4,878,192 A | 10/1989 | Nishiyama et al. | 364/768 |
| 4,890,127 A | 12/1989 | Darley | 364/786 |
| 4,967,388 A | 10/1990 | Tate | 364/760 |
| 4,972,362 A | 11/1990 | Elkind et al. | 364/760 |
| 5,114,577 A | 5/1992 | Kusano et al. | 210/198.2 |
| 5,115,408 A | 5/1992 | Darley et al. | 364/754 |
| 5,144,577 A | 9/1992 | Linnenberg | |
| 5,206,825 A | 4/1993 | Takagi et al. | 364/746.2 |
| 5,270,962 A | 12/1993 | Fettweis | 364/766 |
| 5,341,322 A | 8/1994 | Fettweis et al. | 364/764 |
| 5,386,377 A | 1/1995 | McClure | 364/787 |
| 5,418,736 A | 5/1995 | Widigen et al. | 364/786 |
| 5,659,495 A | 8/1997 | Briggs et al. | 364/736.02 |
| 5,680,339 A | 10/1997 | Moyse et al. | 364/745 |
| 5,696,954 A | 12/1997 | Guttag et al. | 395/562 |
| 5,754,819 A | 5/1998 | Lynch et al. | 395/421.08 |
| 5,764,550 A | 6/1998 | D'Souza | 364/716.04 |
| 5,808,928 A | 9/1998 | Miyoshi | 364/760.01 |
| 5,815,420 A | 9/1998 | Steiss | 364/736.04 |
| 5,923,579 A | 7/1999 | Widigen et al. | 364/786.01 |
| 6,466,960 B1 * | 10/2002 | Winters | 708/671 |
| 6,519,621 B1 | 2/2003 | Yano | 708/603 |
| 6,629,118 B1 * | 9/2003 | Hutchison et al. | 708/525 |

OTHER PUBLICATIONS

Cortadella, J. et al. "Evaluation of A+B=K Conditions Without Carry Propagation", 8092 IEEE Transactions on Computers 41, (1992) Nov., No. 11, New York, US, pp. 1484–1488.

(List continued on next page.)

*Primary Examiner*—David H. Malzahn
(74) *Attorney, Agent, or Firm*—Larry M. Mennemeier

(57) ABSTRACT

A method and apparatus is disclosed to compare numbers for equality. The numbers represented in a redundant form, including numbers received from a bypass circuit are subtracted.

More specifically, a complemented form is generated and supplied to an arithmetic circuit for at least one number represented in the redundant form. Input to the arithmetic circuit is adjusted to augment a result generated through the arithmetic circuit to generate a valid outcome represented in the redundant form as a result of a subtraction operation. Results of the subtraction operation are compared to zero in redundant form using a non-propagative circuit and without requiring carry propagation, thereby producing an equality comparison of the number in redundant form.

12 Claims, 31 Drawing Sheets

OTHER PUBLICATIONS

Parhami, B., "Comments on Evaluation of A+B=K Conditions Without Carry Propagation", XP–000770188 IEEE Transactions on Computers, vol. 43, No. 4, Apr. 1994, pp. 381.

PCT International Search Report, Application No. PCT/US 00/42165, date of completion of search, Jul. 3, 2001.

Parhami, B., "Evaluation of A+B=K Conditions Without Carry Propagation," IEEE Transactions on Computers, vol. 43, No. 4, Apr. 1994.

Cortadella, J. et al., "Comments on Evaluation of A+B =K Conditions Without Carry Propagation," IEEE Transactions on Computers, vol. 41, No. 11, Nov. 1992.

Duprat, J. et al., "Ecrire les nombres autrement pour calculer plus vite," Technique et Science Informatiques, vol. 10, No. 3, 1991 (in French).

Parhami, B. et al., "On the Implementation of Arithmetic Support Functions for Generalized Sign–Digit Number Systems," IEEE Transactions on Computers, vol. 42, No. 3, Mar. 1993.

Lutz, D. et al., "Early Zero Detection," International Conference on Computer Design, pp. 545–550, 1996.

Lutz, D. et al., "The Half–Adder Form and Early Branch Condition Resolution," Arithmetic 13, pp. 266–273, 1997.

Lutz, D. et al., "Comparison of two's complement numbers," Int. J. of Electronics, vol. 80, No. 4, pp. 513–523, 1996.

Lutz, D. et al., "Programmable Modulo–K Counters," IEEE Transactions on Circuits and Systems–1: Fundamental Theory and Applications, vol. 43, No. 11, Nov. 1996.

Obaidat, M.S. et al., "Fast multi–step addition algorithmm" Int. Jnl. of Electronics, vol. 70, No. 5, pp. 839–849, 1991.

* cited by examiner-

FIG. 3b
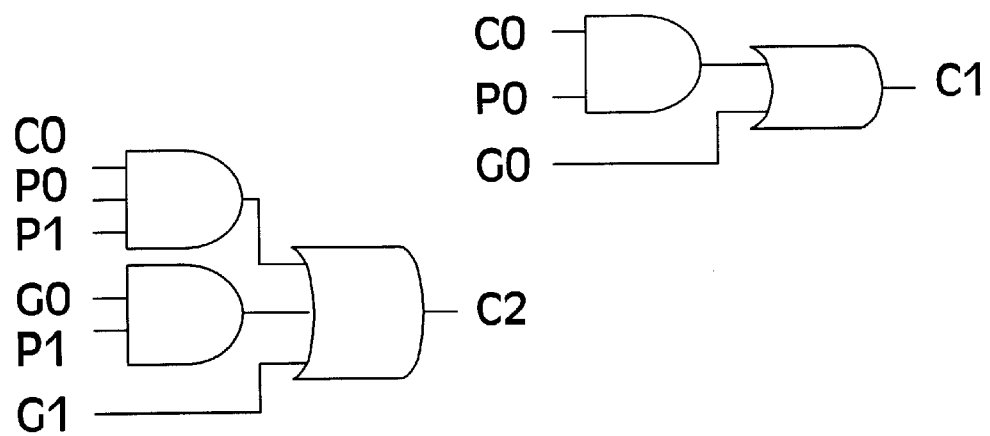
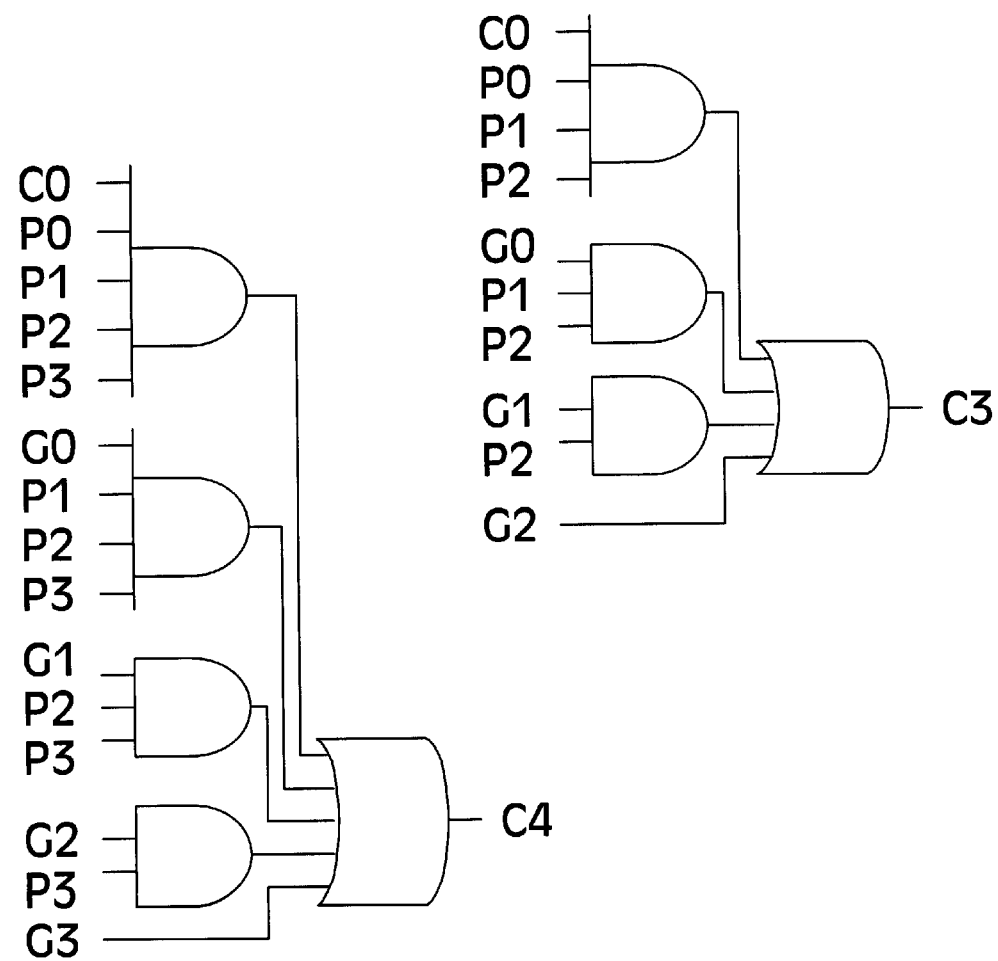

| Pair i | 0 + 0 | 1 + 1 | -1 + -1 | |
|---|---|---|---|---|
| Pair i -1 | any | any | any | |
| Output | $C_i = 0$ $U_i = 0$ | $C_i = 1$ $U_i = 0$ | $C_i = -1$ $U_i = 0$ | |

| Pair i | 0 + 1 | -1 + 0 | -1 + 0 | 0 + 1 |
|---|---|---|---|---|
| Pair i -1 | no -1 | no -1 | has -1 | has -1 |
| Output | $C_i = 1$ $U_i = -1$ | $C_i = 0$ $U_i = -1$ | $C_i = -1$ $U_i = 1$ | $C_i = 0$ $U_i = 1$ |

Rules for adding sign-digit numbers:
$Sum_i = C_{i-1} + U_i$

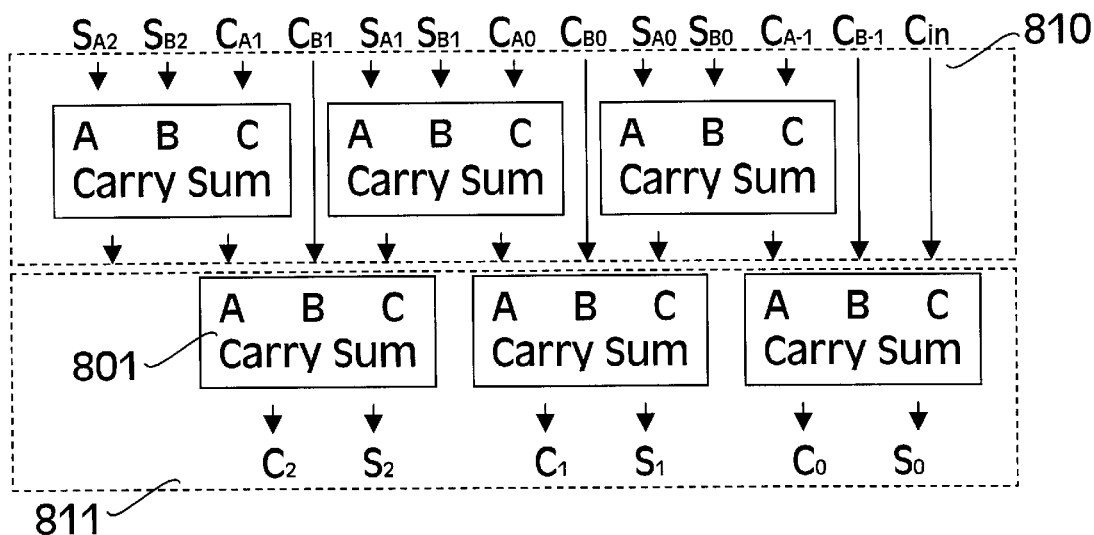

|  | $C_2S_2$ | $C_1S_1$ | $C_0S_0$ |
|---|---|---|---|
| 910 | 00 | 00 | 00 |
| 911 | 01 | 01 | 10 |
| 912 | 01 | 10 | 00 |
| 913 | 00 | 11 | 10 |
| 914 | 10 | 00 | 00 |
| 915 | 11 | 01 | 10 |
| 916 | 11 | 10 | 00 |
| 917 | 10 | 11 | 10 |

FIG. 9a

|  | $C_2S_2$ | $C_1S_1$ | $C_0S_0$ |
|---|---|---|---|
| 920 | 11 | 11 | 11 |
| 921 | 10 | 10 | 01 |
| 922 | 10 | 01 | 11 |
| 923 | 11 | 00 | 01 |
| 924 | 01 | 11 | 11 |
| 925 | 00 | 10 | 01 |
| 926 | 00 | 01 | 11 |
| 927 | 01 | 00 | 01 |

FIG. 9b

|  | $C_2S_2$ | $C_1S_1$ | $C_0S_0$ |  | $\overline{C_2S_2}$ | $\overline{C_1S_1}$ | $\overline{C_0S_0}$ |  |
|---|---|---|---|---|---|---|---|---|
| 3 = | 00 | 01 | 01 | → | 11 | 10 | 10 | = 2 |
| 2 = | 00 | 01 | 00 | → | 11 | 10 | 11 | = 3 |
| 1 = | 00 | 00 | 01 | → | 11 | 11 | 10 | = -4 |
| 0 = | 00 | 00 | 00 | → | 11 | 11 | 11 | = -3 |
| -1 = | 01 | 01 | 01 | → | 10 | 10 | 10 | = -2 |
| -2 = | 01 | 01 | 00 | → | 10 | 10 | 11 | = -1 |
| -3 = | 01 | 00 | 01 | → | 10 | 11 | 10 | = 0 |
| -4 = | 01 | 00 | 00 | → | 10 | 11 | 11 | = 1 |

$N \rightarrow \overline{N} = -N-3 \pmod 8$

FIG. 10

| $C_2S_2$ | $C_1S_1$ | $C_0S_0$ | $(S_2 \oplus C_1) \oplus (S_1 + C_0)$ |        |
|----------|----------|----------|--------------------------------------|--------|
| 00       | 00       | 00       | 0 0 0 0 0 0 0                        | 2200   |
| 01       | 01       | 10       | 1 1 0 0 1 1 1                | 2201   |
| 01       | 10       | 00       | 1 0 1 0 0 0 0                    | 2202   |
| 00       | 11       | 10       | 0 0 1 0 1 1 1                | 2203   |
| 10       | 00       | 00       | 0 0 0 0 0 0 0                | 2204   |
| 11       | 01       | 10       | 1 1 0 0 1 1 1                | 2205   |
| 11       | 10       | 00       | 1 0 1 0 0 0 0                    | 2206   |
| 10       | 11       | 10       | 0 1 1 0 1 1 1                | 2207   |

METHOD AND APPARATUS FOR PERFORMING EQUALITY COMPARISON IN REDUNDANT FORM ARITHMETIC

CROSS-REFERENCES TO RELATED APPLICATIONS

This non-provisional U.S. national application, filed under 35 U.S.C. § 111(a) claims, under 35 U.S.C. § 119(e)(1), the benefit of the filing date of provisional U.S. application Ser. Nos. 60/171,872 and 60/171,863, both filed under 35 U.S.C. § 111(b) on Dec. 23, 1999.

FIELD OF THE INVENTION

The present invention relates to the field of computer operations on numbers in binary form, including addition, subtraction and equality comparisons. In particular, it relates to these operations when numbers are represented in redundant form.

BACKGROUND OF THE INVENTION

In digital computations, the representation of numbers has a significant bearing upon the design of digital arithmetic circuits and therefore, upon their performance and complexity. Integer operands are represented in binary forms by ones and zeros in a base 2 number system. Three commonly used representation methods are called: sign-magnitude, one's complement, and two's complement.

FIG. 1a shows numbers represented in sign-magnitude. In sign-magnitude numbers, the most significant bit represents the sign (positive or negative) of the number. A sign-magnitude number can be negated by complementing the number's sign bit. When adding two positive or two negative numbers, the operation is straightforward. But, when the signs of the operands are different, the number with the smaller magnitude should be subtracted from the number with the larger magnitude. This makes arithmetic operations on sign-magnitude numbers cumbersome. The circuit for performing arithmetic operations must include an adder circuit, a subtracter circuit and a comparator circuit. Because of the complexity, and because of a serial dependency upon a comparison to control the arithmetic circuitry, designers have proposed other representation methods.

FIG. 1b shows numbers represented in one's complement. One way of determining the representation of a negative number in one's complement is to subtract the magnitude of the number from $2^n-1$ where n is the number of digits used in the representation. For example, if the word length is 4 bits, then $2^4-1=15$ is used, and the ones complement representation of $-7$ is calculated as shown in 120 of FIG. 1b.

A simpler way of determining the representation of a negative number in ones complement is to complement each bit of the corresponding positive number. This observation is key to simplifying subtraction for ones complement numbers. Since negating a number, B, is easily accomplished by digital circuitry, subtracting is accomplished through a combination of addition and negation;

$$A-B=A+(-B).$$

Since there are two ways to represent zero in the ones complement representation method, addition circuitry is still slightly complicated.

FIG. 1c shows numbers represented in twos complement. In twos complement representation, there is only one representation for zero. The representation of a negative number can be determined by subtracting the magnitude of the number from $2^n$ where n is the number of digits used to represent the number. For example, to find the representation of $-7$ in twos compliment, $2^4=16$ is used, as in the calculation shown in 130 of FIG. 1c.

FIG. 2 shows a 4-bit adder/subtracter for numbers represented in twos complement. A benefit of twos complement is that it reduces the complexity of the adder circuit. A twos complement adder/subtracter can be simplified by implementing twos complement negation as ones complement negation followed by incrementation.

In an addition/subtraction operation, carry signals propagate from right to left (less significant to more significant) until they reach a final destination, which can include the leftmost digit of a result. The time it takes for carry signals to propagate is directly related to the time it takes for a digital arithmetic circuit to produce a result of an operation. The circuit of FIG. 2 is referred to as a ripple adder. In a ripple adder, a carry signal at stage i+1 is given as a function of the inputs at the ith stage.

FIG. 3a shows a carry-lookahead adder circuit, which uses a circuit shown in FIG. 3b to propagate the carry signal. These circuits directly produce carry propagate and carry generate signals at each stage.

The response time for a ripple adder with n stages is proportional to n, whereas the response time for a faster implementation such as a carry-lookahead adder is proportional to a logarithm of n.

In a system of numbers, where each number is assigned multiple binary representations, the numbers are said to be in redundant form. Further improvements in adder response times make use of numbers represented in redundant forms. For example, U.S. Pat. Nos. 4,890,127 and 5,815,420, use a signed-digit redundant representation form. Each digit is represented as a sign bit and a magnitude bit and can take on values of 1, 0, and $-1$.

FIG. 4 shows a circuit for calculating the sign bit and magnitude bit for each digit in the result, Z, from the digits of the operands, X and Y (as described in FIG. 2 in U.S. Pat. No. 4,890,127). Negation is simple but calculations are somewhat complicated due to sign comparisons, and some calculations can generate new carries, which must be allowed to propagate. FIG. 5 shows a set of rules to determine intermediate carries and sums, that avoids generating problematic new carries but introduces some additional computational complexity (from N. Takagi et al, "High speed VLSI multiplication algorithm with redundant binary addition tree," IEEE Trans. On Computes, 34 (September 1985) 789–796).

Current microprocessors make use of pipelining to reduce the cycle time and exploit parallelism within instruction streams. In order to make pipelining efficient, results from digital arithmetic circuitry are bypassed back to circuit inputs as operands for the next instruction in a pipeline. This technique is preferred over one of waiting until results are written back to a register file, and it provides for higher utilization of a pipeline's parallelism.

Conversion from a redundant representation form to twos complement requires the propagation of carry signals. When results of a first operation are immediately required to perform a second operation, a conversion reduces the benefits of performing digital arithmetic in redundant form.

In U.S. Pat. No. 5,923,579, Widegen et al have shown a three-input comparator, where one of the inputs is an implicit constant. FIG. 6 shows a preferred embodiment of the comparator device consisting of a custom carry-save adder (CSA) structure and a carry-propagate circuit (CPC). The custom CSA uses two different bit cells depending upon whether that bit position in the constant input is a one or a zero, and the CPC employs a full carry-lookahead circuit to provide the comparison result as quickly as possible.

BRIEF DESCRIPTION OF THE DRAWINGS

FIG. 3b shows the circuits used to produce carry propagate and carry generate signals and to propagate the carry signal in a carry-lookahead adder.

FIG. 7c shows another implementation out of numerous possible implementations of a compressor or counter device, this one using a read-only memory (ROM) circuit. Any of these numerous implementations can be used to construct a carry save adder.

FIG. 8 shows a carry save adder constructed from 3:2 compressor circuits with the same functionality as the circuits shown in FIG. 7b or FIG. 7c.

FIG. 9a shows all of the valid 3-digit representations using a redundant form with a carry bit and a sum bit for each binary digit of the number zero.

FIG. 9b shows all of the valid 3-digit representations using a redundant form with a carry bit and a sum bit for each binary digit of the number negative three.

FIG. 10 shows a mapping of numbers in a redundant representation having three digits that corresponds to complementation by bitwise negation.

FIG. 13 also shows two possible locations to tap results in redundant form for bypassing.

DETAILED DESCRIPTION

The present invention provides an efficient method for bypassing outputs while in redundant form to an uncomplicated arithmetic circuit that is capable of adding or subtracting numbers in redundant from and comparing a result without requiring propagation of carry signals.

For one embodiment of the invention, an arithmetic circuit subtracts numbers received in redundant form and compares the result to zero represented in redundant form without carry propagation.

Another embodiment of the invention is a method, which includes generating a complemented redundant form of a number supplied in redundant form to an arithmetic circuit, and adjusting an input to the arithmetic circuit to augment a result. The result thus generated through the arithmetic circuit is a valid outcome in redundant form of a subtraction operation. The method also includes comparing this result to zero using a non-propagative comparator to determine equality or inequality of two numbers in redundant form.

Yet another embodiment is described, which comprises: generating through a first arithmetic circuit a first valid outcome represented in the redundant form, and comparing the outcome using a second arithmetic circuit to generate a second valid outcome represented in redundant form of a subtraction operation on the first outcome and another number K received in redundant form, and further using a non-propagative comparator circuit to determine equality or inequality of the first outcome to the other number K by comparing the second outcome to zero represented in redundant form.

Thus at very high computation rates, efficient bypassing of operands in redundant form can be accomplished for operations including addition, subtraction and equality comparisons.

One redundant form that is useful for implementing fast arithmetic circuits uses a carry bit, $C_A$, and a sum bit, $S_A$, for each digit of the binary representation of a number, A. As will be shown in more detail below, this particular redundant form representation permits numbers to be added together using a carry-save adder.

Figure 7A:
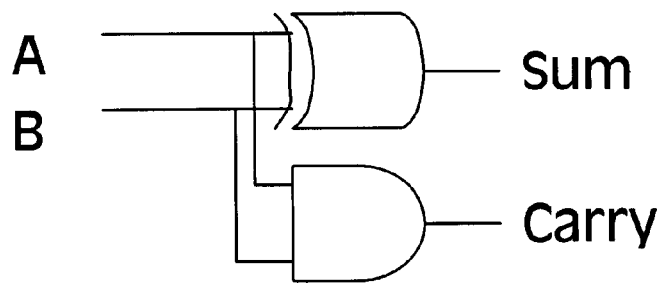
FIG. 7a shows a half adder circuit, which can be used as a building block to construct a full adder circuit.

The carry save adder has a structure very similar to that of a traditional adder except for eliminating the need to propagate carry signals along the length of the result. A carry save adder operates on numbers represented in a redundant form. Each digit position has a sum bit and a carry bit. When adding two of these numbers together, circuits similar to traditional half adders and 3:2 compressors can be used. FIG. 7a shows the traditional half adder, and FIG. 7b shows a 3:2 compressor circuit that can be used to form the basic building block of a carry save adder, according to one embodiment of the current invention.

Figure 7B:
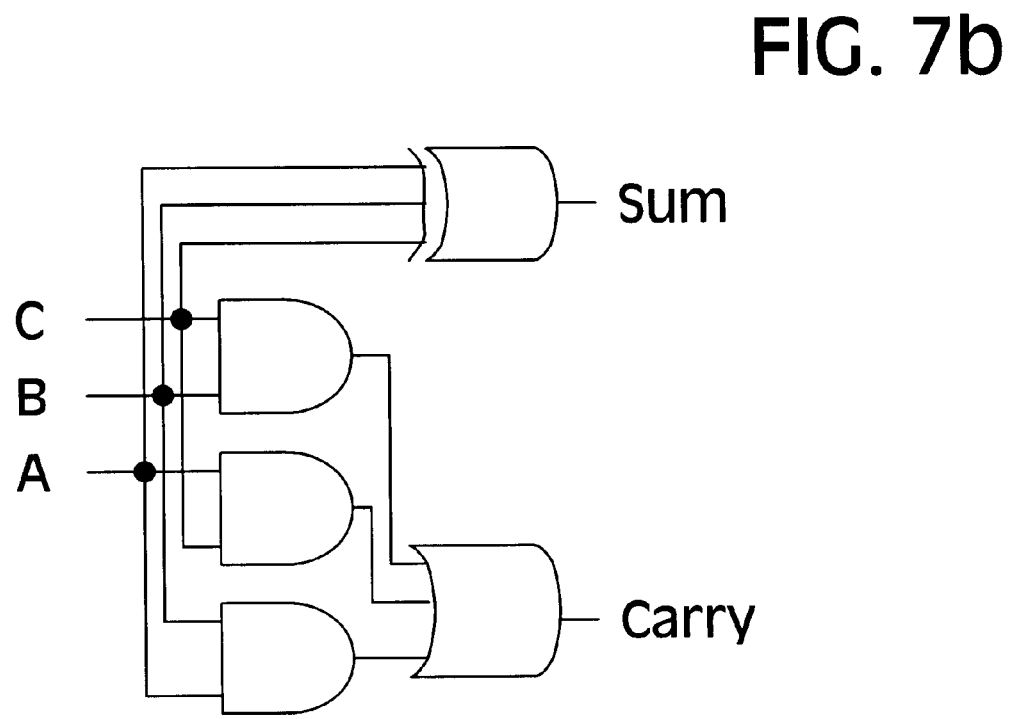
FIG. 7b shows a 3:2 compressor or counter that can be used to form the basic building block of a carry save adder.

FIG. 8 shows how a carry save adder can be constructed from the 3:2 compressor circuit of FIG. 7b. If the B inputs were derived from a twos complement representation of −B, then the results produced by the digital arithmetic circuit of FIG. 8 will be one of the valid representation of A−B in a carry-sum redundant form. But if a redundant form representation of B needs to be negated, then a conversion to two's complement requires propagation of B's carry bits. The present invention provides that at least one valid carry-sum representation of −B can be produced from any valid representation of B in carry-sum redundant form.

Figure 1A:
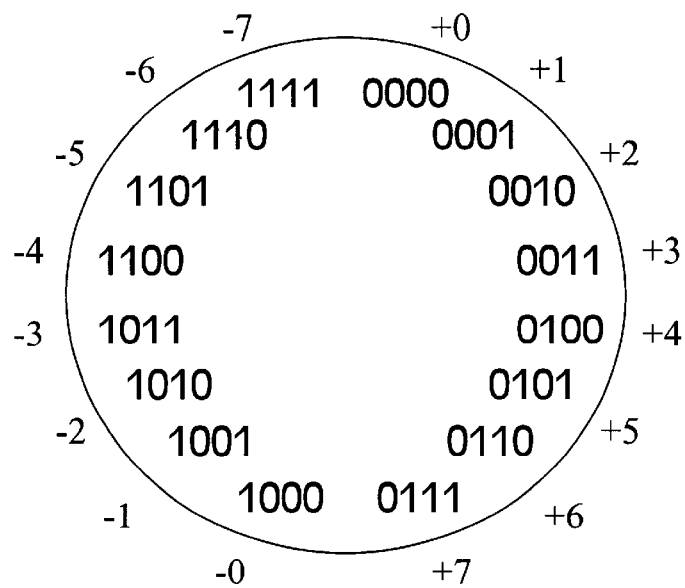
FIG. 1a shows 4-digit numbers represented in the sign-magnitude representation method.
Figure 1B:
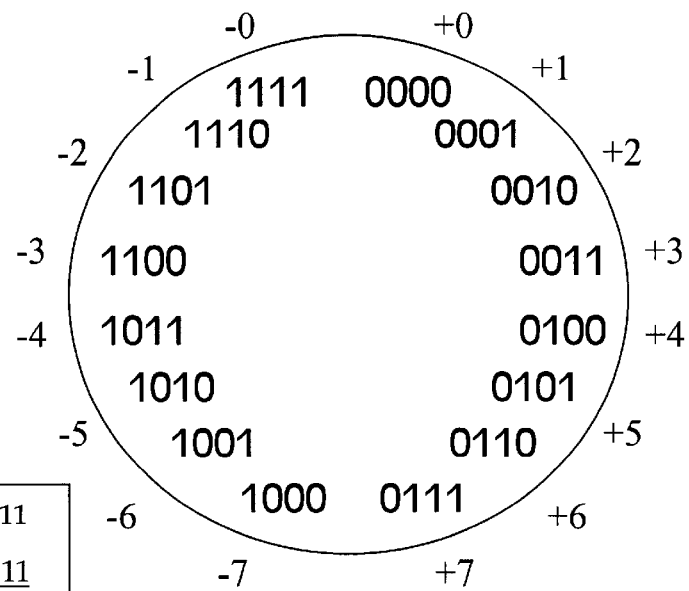
FIG. 1b shows 4-digit numbers represented in the one's complement representation method and an example of negation.
Figure 1C:
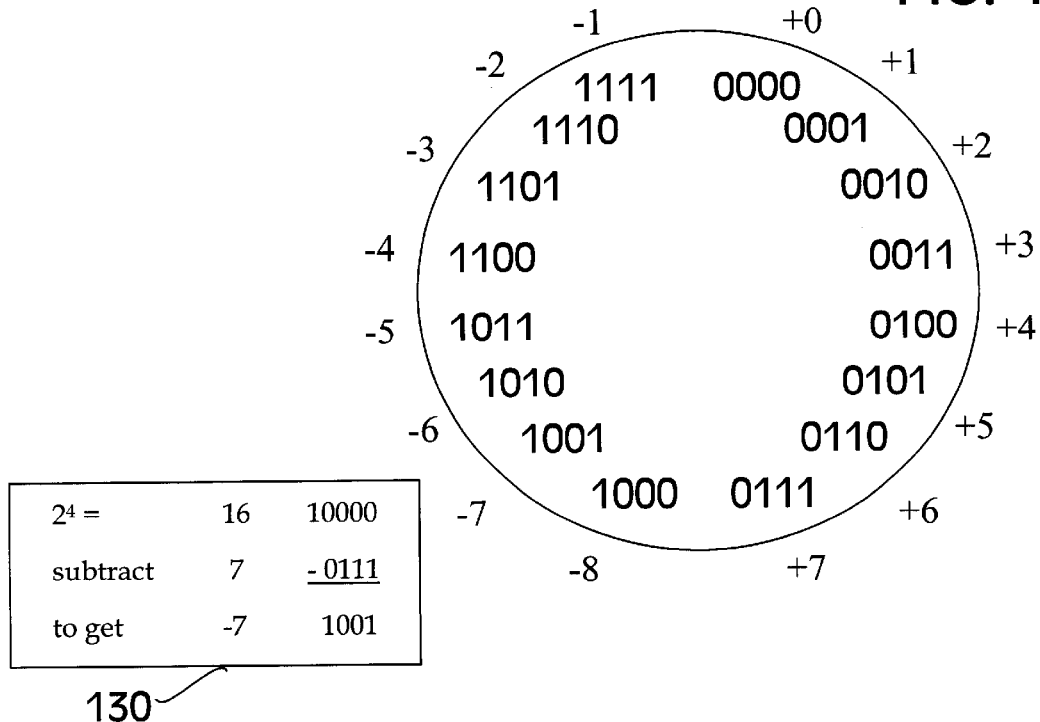
FIG. 1c shows 4-digit numbers represented in the two's complement representation method and an example of negation.
Figure 2:
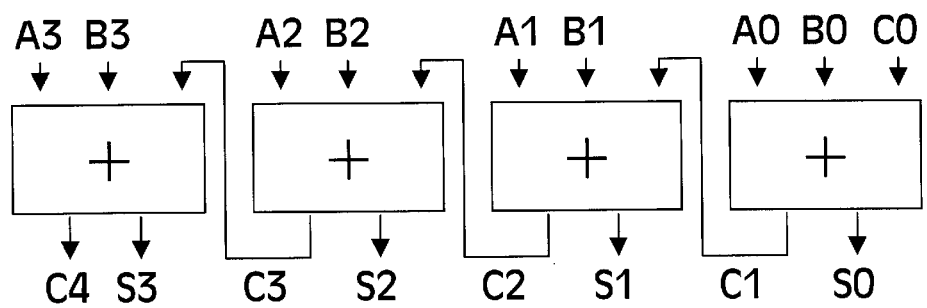
FIG. 2 shows a 4-bit ripple adder/subtracter for numbers represented in two's complement.
Figure 3A:
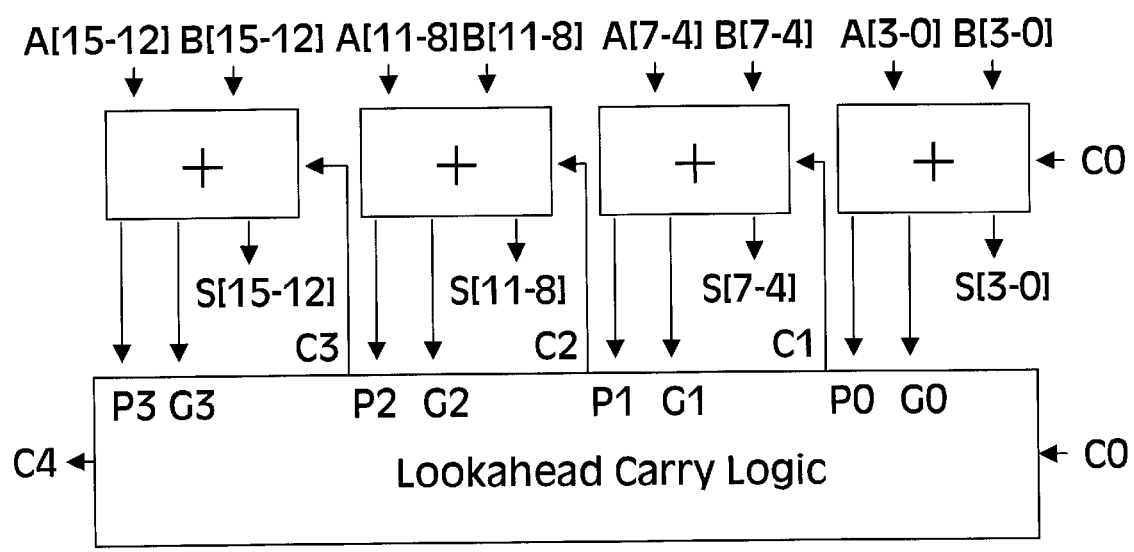
FIG. 3a shows a carry-lookahead adder circuit.
Figures 4, 5:
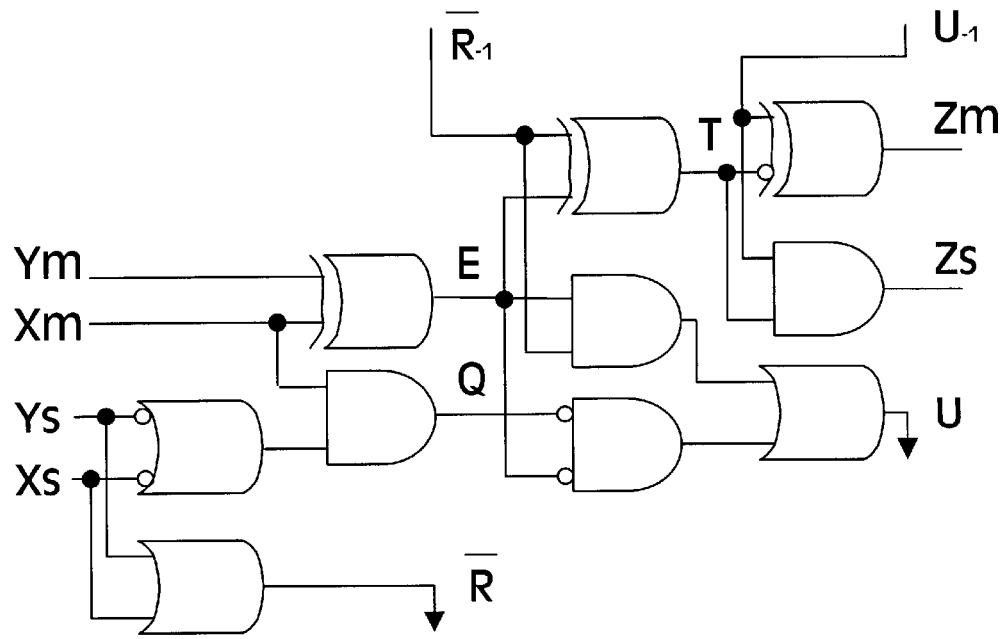
FIG. 4 shows a signed-digit adder circuit of a prior art redundant arithmetic method.
FIG. 5 shows rules for a method of adding numbers represented in signed-digit redundant form.
Figure 6:
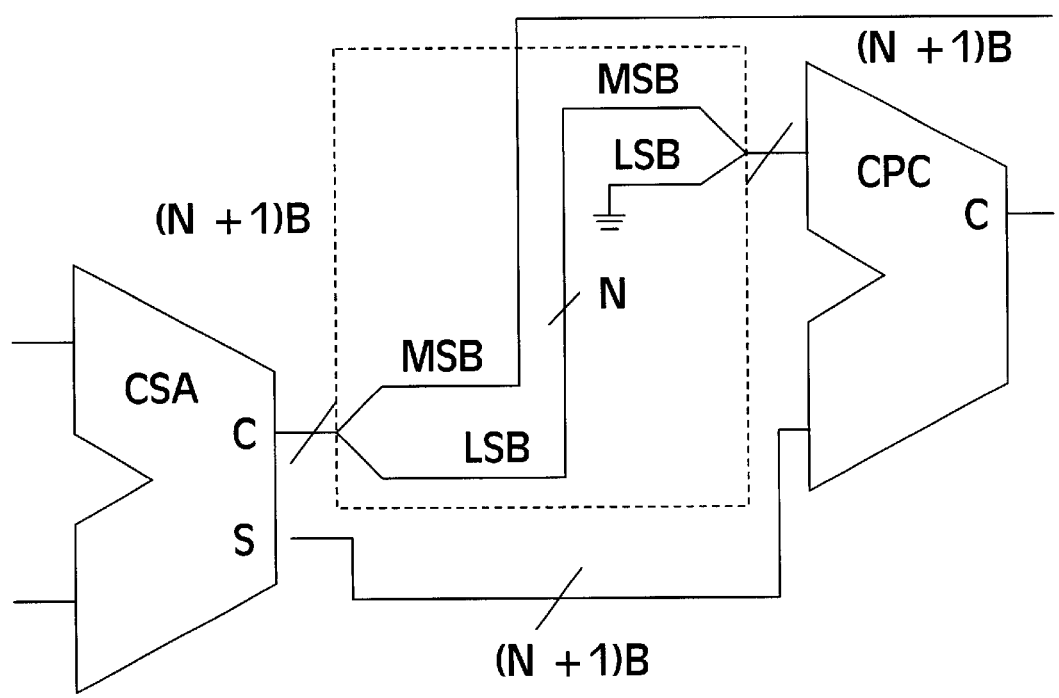
FIG. 6 shows a prior art three input comparator using a custom carry-save adder to add two inputs to an implicit constant and a carry-propagation circuit to generate a result of the comparison.

In a twos complement binary representation, where n is the number of bits used to represent the number each specific number, from $-2^{n-1}$ to $2^{n-1}-1$, has exactly one representation. This fact is illustrated in FIG. 2c. In a redundant representation, there are multiple valid combinations that can be used to represent any number. For example, when the number, zero, is represented with carry bits and sum bits as described above, there are $2^d$ redundant representations, where d is the number of binary digits in the number. These $2^d$ representations for zero using three digits are shown in FIG. 9a. An addition operation performed on any two valid representations of zero, from FIG. 9a, using a carry-save adder will result in another one of the valid representations for zero shown in FIG. 9a.

In order to derive all of the possible redundant representations for a given number A. One could start with one valid redundant representation of A, and perform addition operations using a carry-save adder upon the initial valid representation of A, with each valid representation of zero from FIG. 9a. For example, FIG. 9b shows all of the valid redundant representations of the number negative three (−3) using three digits. Redundant representation 927 can be derived from the twos complement representation of −3 (in binary 101) by inserting 0s for each digit's carry bit. Then redundant representation 920 can be derived by adding the redundant zero representation 917 to the redundant −3 representation 927. Redundant representation 921 can be derived by adding the redundant zero representation 912 to the redundant −3 representation 927. Redundant representation 922 can be derived by adding the redundant zero representation 911 to the redundant −3 representation 927. Redundant representation 923 can be derived by adding the redundant zero representation 914 to the redundant −3 representation 927. Redundant representation 924 can be derived by adding the redundant zero representation 913 to the redundant −3 representation 927. Redundant representation 925 can be derived by adding the redundant zero representation 916 to the redundant −3 representation 927. Finally, redundant representation 926 can be derived by adding the redundant zero representation 915 to the redundant −3 representation 927.

Thus each valid redundant representation of a desired number can be derived from any other valid representation of a first number by performing addition operations with all valid redundant representations of a second number, provided that the first number and the second number sum to produce the desired number. Since it is known in the art, that a carry-save adder produces a valid result for a subtraction operation if the number being subtracted was negated in the twos complement representation method, the above description informs us that the carry-save adder produces valid results for all other redundant representations of the number to be subtracted. The present invention provides an efficient way of determining a correct redundant representation corresponding to a negation of each valid redundant representation of a number to be subtracted.

Referring once again to FIGS. 9a and 9b, one can observe from the tables shown that the redundant representation for the number zero, 910, if complemented using bitwise negation, produces the redundant representation for the number negative three, 920. Likewise, the complement of redundant representation, 911, produces similarly the redundant representation, 921, and so on for each valid redundant representation of zero shown in FIG. 9a. Therefore, any subtraction of zero using a carry-save adder would produce a result that was incorrect by a difference of exactly three if the redundant representation of negative zero were produced using bitwise negation as the complement. Further, that result could be corrected by adding any valid representation of three back into the sum produced by the carry-save adder.

As seen in the above description, when this correction method works for one valid redundant representation of a number is also works for all valid redundant representations of that number. FIG. 10 shows a mapping from valid three digit redundant representations of numbers from negative four (−4) through three (3) into valid three-digit redundant representations for the same range of numbers. From the table, it can be seen that the complement of a number N represented in redundant form is a valid redundant representation of −N−3 modulo the size of the set of numbers represented (in the case shown by FIG. 10, the set size is eight).

The method described above for subtracting two numbers, A and B, represented in redundant form, having vectors of carry bits, $C_A$ and $C_B$, and vectors of sum bits, $S_A$ and $S_B$, can be expressed as follows:

$$A - B = (S_A + 2C_A) - (S_B + 2C_B)$$
$$= (S_A + 2C_A) + (-S_B - 2C_B)$$
$$= (S_A + 2C_A) + ((\sim S_B + 1) + 2(\sim C_B + 1))$$
$$= (S_A + 2C_A) + (\sim S_B + 2(\sim C_B) + 3)$$

where a bitwise complement operation is indicated by the symbol, "$\sim$."

Thus an efficient method for generating a redundant representation corresponding to the negation of a number represented in redundant form, and for correcting that representation through use of a carry-save adder circuit to produce a valid result in redundant form corresponding to a subtraction operation is herein disclosed.

One embodiment of the present invention uses a circuit having functionality similar to the one shown in FIG. 7b or FIG. 7c to construct a carry-save adder structure like the one shown in FIG. 8. This adder completes the addition operation in two stages. Stage one, 810, receives as inputs three input bits for each digit in the representation of the numbers to be added and outputs two bits for each digit to stage two, 811. Each stage is a regular structure constructed of blocks like the one shown, 801, which perform the functions of the circuit shown in FIG. 7b. Stage two, 811, receives as inputs the intermediate sum and carry results from stage one, 810, and also receives a fourth input bit from each digit of one of the input operands. Stage two, 811, produces a redundant representation having a sum bit and a carry bit for each digit of the resulting sum of the two input operands.

Figure 11:
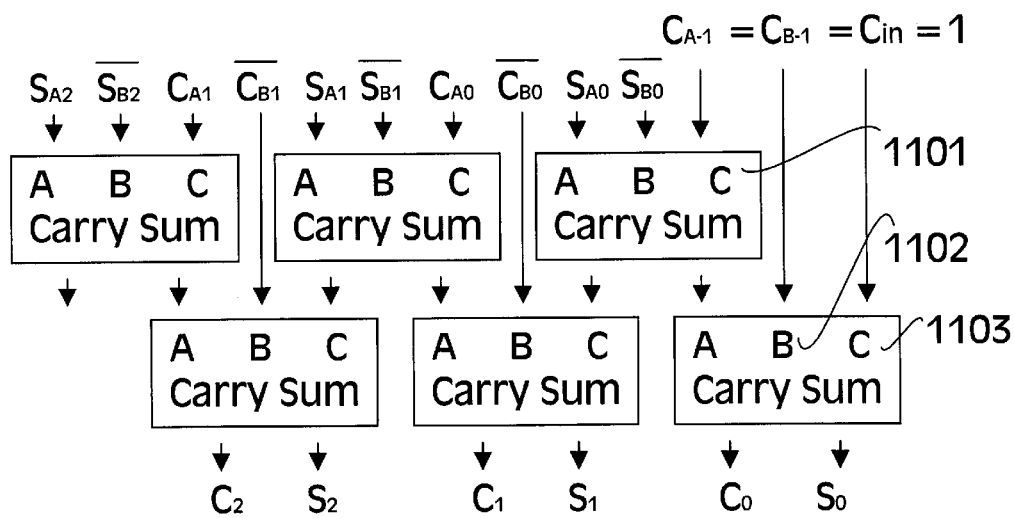
FIG. 11 shows one embodiment of a redundant adder being used to perform subtraction on operands received in redundant form using one possible arithmetic apparatus and one possible method of providing adjustment input.

FIG. 11 shows a carry-save adder structure, like the one described in FIG. 8, being used in one alternative embodiment of the invention to perform a subtraction operation A−B, where B is a number represented by any one of its possible valid redundant representations. In order to perform the subtraction operation, each of the carry bits and each of the sum bits in a redundant representation of B are complemented and supplied to the carry-save adder. Then a result is corrected by adding an adjustment of three. This is performed in FIG. 11, by setting three carry bits, $C_{A-1}$, $C_{B-1}$ and $C_{in}$ to a logic value of 1. When the combination of these three carry bits are received at the inputs provided in the carry-save adder circuit at, input 1101, input 1102 and input 1103, they are incorporated into the result. Thus the circuit configured as shown in FIG. 11, produces a valid redundant representation for the subtraction operation A−B.

Figure 12:
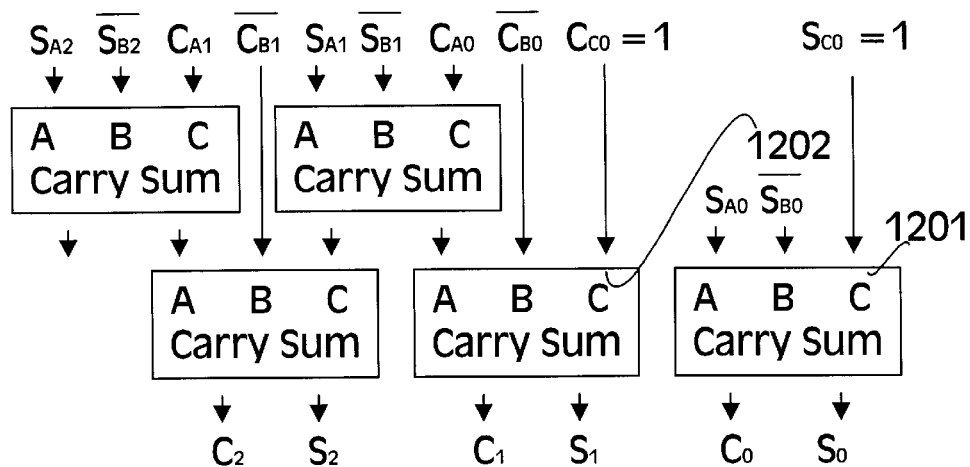
FIG. 12 shows another embodiment of a redundant adder being used to perform subtraction on operands received in redundant form using a second possible arithmetic apparatus and a second possible method of providing adjustment input.

FIG. 12 shows another alternate embodiment of the invention. As discussed above, any valid representation of the adjustment value can be used to correct the resulting sum. In FIG. 12, the least significant carry-save adder block receives, along with the least significant sum bits of the input operands, a least significant sum bit, $S_{C0}$, for the correction value at input 1201. The carry-save adder block that produces the second least significant digit, receives also a carry bit, $C_{C0}$, for the correction value at input 1202. Thus the circuit configured as shown in FIG. 12, also produces a valid redundant representation for the subtraction operation A−B.

By selecting a different form of redundant representation and perhaps a different redundant adder design, it is possible for those having skill in the art to change the adjustment value necessary to correct a result produced using the redundant adder circuit. It is also possible to use the method of the current invention to add and subtract more than two operands, thus changing the adjustment value or values necessary to correct the results produced.

Figure 13:
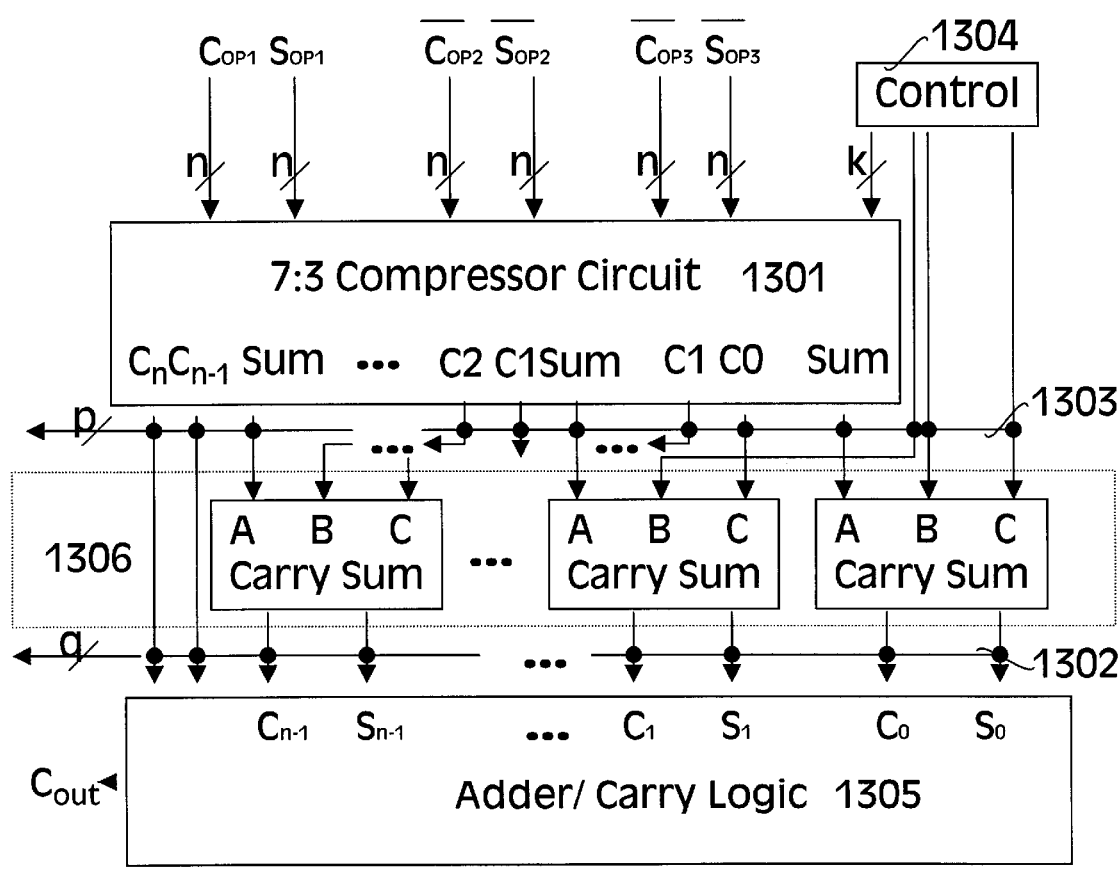
FIG. 13 shows another embodiment of a redundant adder being used to perform subtractions on operands received in redundant form using a third possible arithmetic apparatus capable of accepting up to three operands in redundant form and using a third possible method of providing adjustment input.

FIG. 13 shows another alternate embodiment of the invention, which can be used to sum three operands received in redundant form. Control device 1304 is used to correct the resulting sum through an adjustment input to a 7:3 compressor circuit, 1301, or a 3:2 compressor stage, 1306, or both. In FIG. 13, a result can be tapped for bypassing as an operand of another operation while in redundant form. If a result is tapped for bypassing after adder stage 1306 and before a carry propagation stage, 1305, as shown by the tap, 1302, then a bypassed operand is available in a redundant form having one carry bit and one sum bit per digit, similar to that of the input operands, without needing to wait for carry propagation. But a result could also be tapped for bypassing before stage 1306, as shown by tap, 1303. In such a case, the operand is in a second redundant form having two carry bits and one sum bit per digit. The adder shown in FIG. 13 is capable of accepting two operands in this second redundant form, and control 1304 can provide adjustment input to either circuit 1301 or circuit 1306 or both to correct results when inputs are provided in either redundant form. Thus the circuit configured as shown in FIG. 13, produces valid redundant representation for two or three operand addition/subtraction operations.

Figure 14:
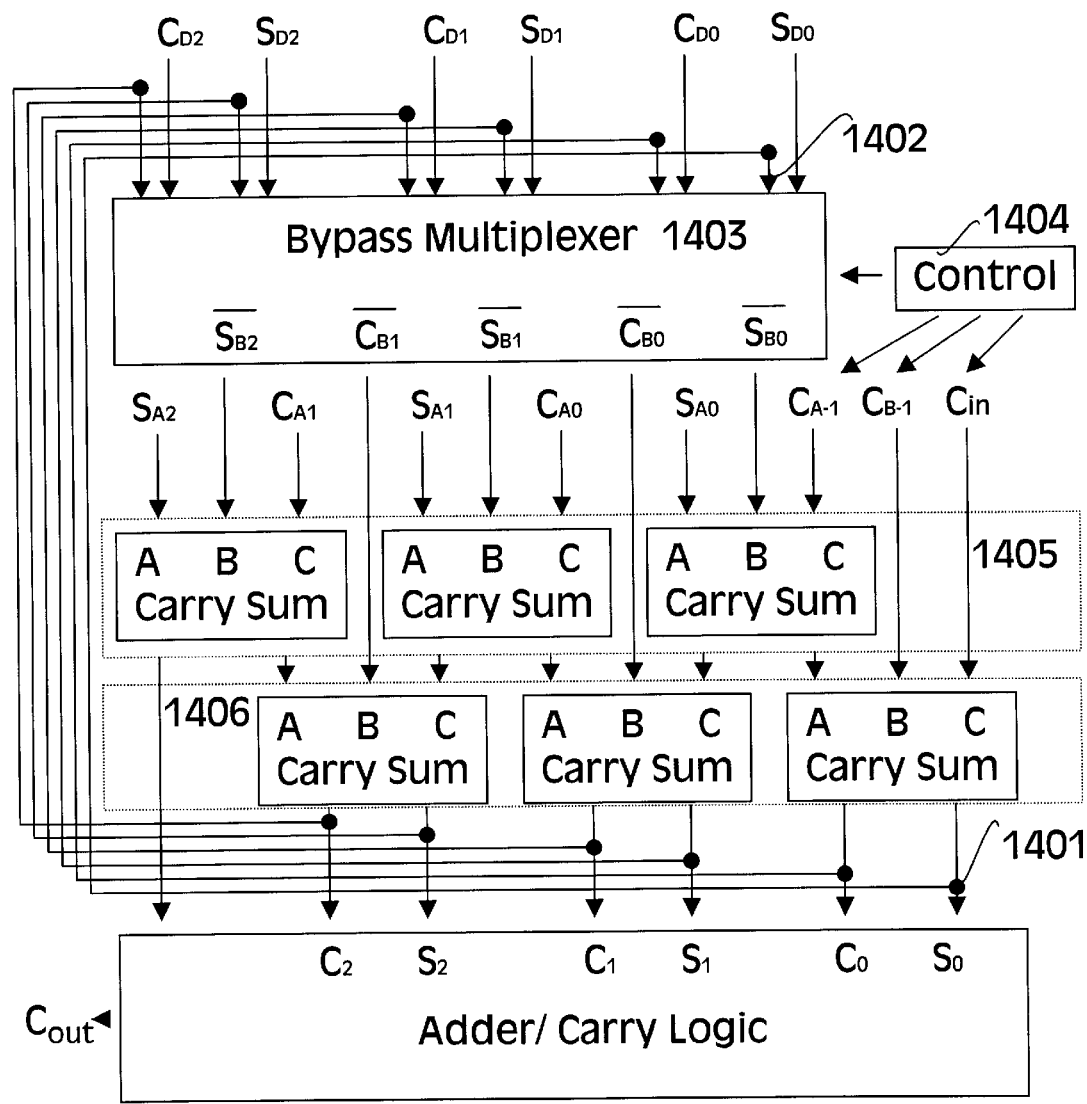
FIG. 14 shows another embodiment a redundant adder being used to perform subtraction on operands received in redundant form with a fourth possible arithmetic apparatus and a detailed illustration of one possible method to bypass operands in redundant form.

FIG. 14 shows another alternate embodiment of the invention including a bypass multiplexer, 1403, to receive, at input 1402, a result bypassed from a tap, 1401, on the output of adder stage 1406. Control device, 1404, selects between an input operand, D, and a bypassed operand, 1402. If the operation to be performed is a subtraction, then Control device, 1404, also selects a complemented output to supply to the B input of adder stage, 1405, and sets adjustment input appropriately. In this case, adjustment input is set as shown in FIG. 11.

Figure 15:
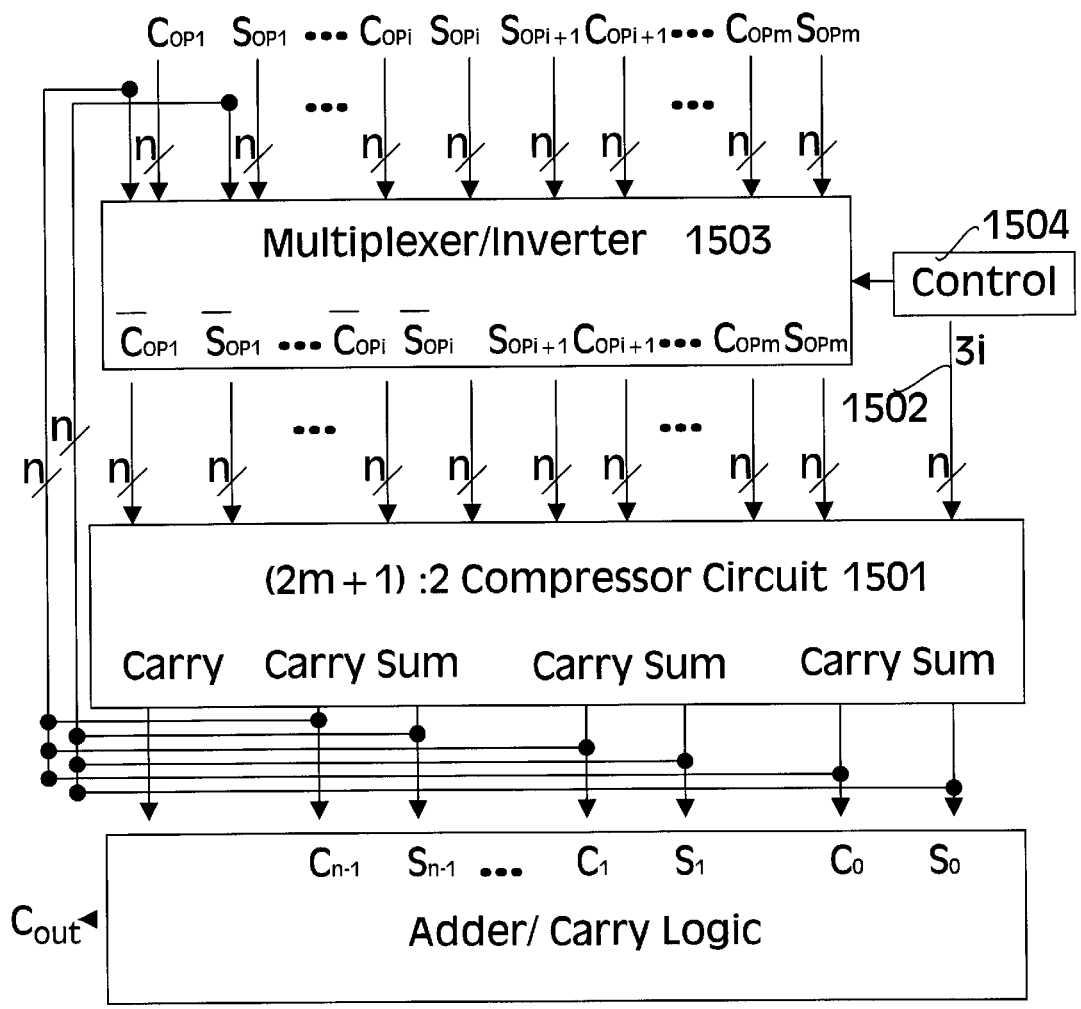
FIG. 15 shows another embodiment of a redundant adder being used to perform subtraction on operands received in redundant form with a fifth possible arithmetic apparatus capable of accepting m operands, each operand comprising n digits represented in redundant form, and subtracting i operands from the sum of the remaining m−i operands. Any of the m operands can be bypassed from results, tapped in redundant form at the outputs of one of a plurality of stages, in similar or dissimilar redundant arithmetic apparatuses.

FIG. 15 shows another alternate embodiment of the invention, which accepts up to m operands in a redundant form. The inputs can be bypassed from a compressor stage of circuit 1501 or from some other arithmetic circuit or supplied by a register file or by memory storage. Operands have n digits, each digit including a carry bit and a sum bit. Any number, i, of the m operands (for I between zero and m) may be negated by complementing the appropriate i*2n output bits of multiplexer/inverter, 1503, under the direction of control, 1504, and adjusting the result produced by circuit 1501 by adding 3i via input, 1502, which is also directed by control, 1504.

Figure 16A:
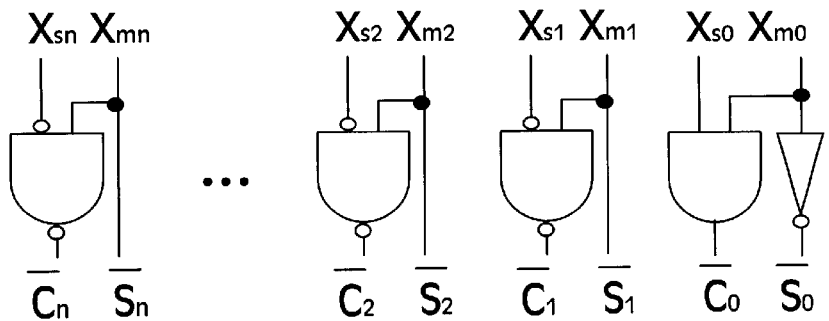
FIG. 16a shows one embodiment of a circuit for complementing a number received in a signed-digit redundant form for subtraction according to the method of FIG. 17.

FIG. 16a shows one possible circuit to generate a complemented form of a number received in redundant form. The number provided to the circuit is represented in a signed-digit redundant form. The number generated by the circuit is in a carry-sum redundant form and complemented in accordance with the methods presently disclosed for the sake of illustration.

Figure 16B:
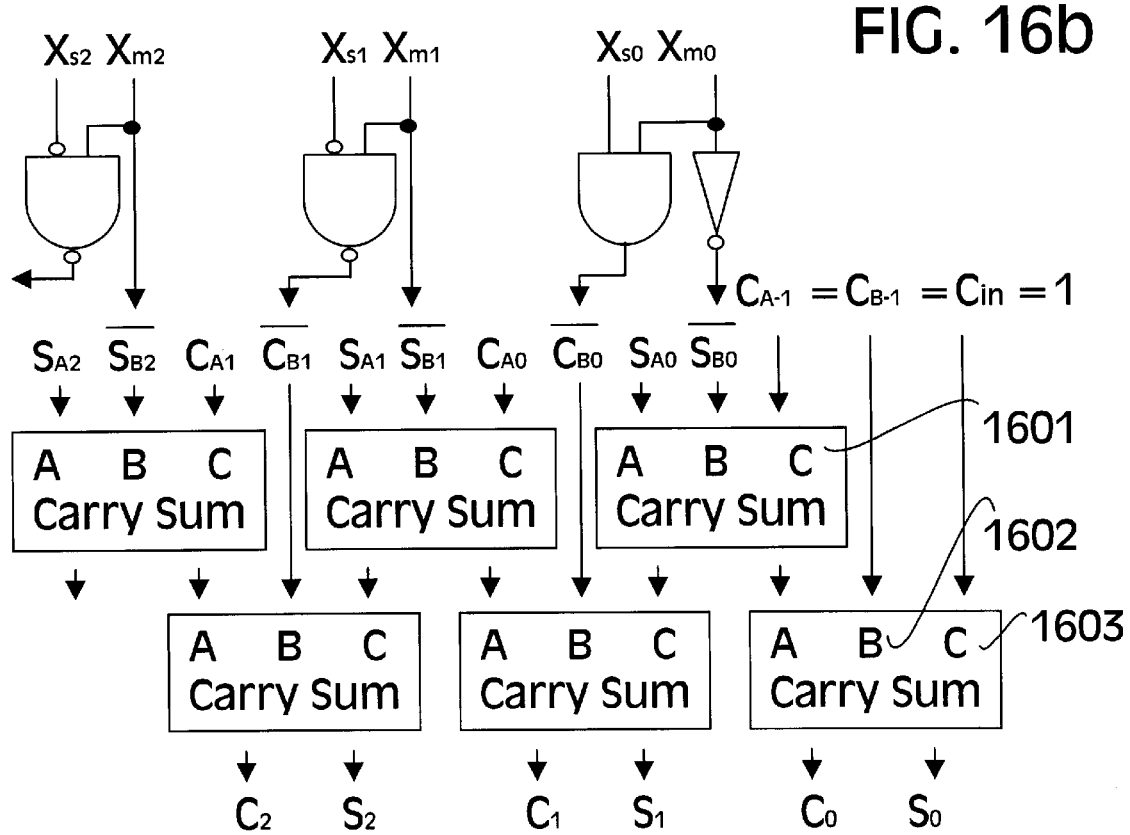
FIG. 16b shows an embodiment of a circuit capable of performing addition and subtraction operations on numbers received in a signed-digit redundant form or a carry-sum redundant form.

FIG. 16b shows a carry-save adder structure, like the one described in FIG. 8, being used in combination with the complementing circuit of FIG. 16a in another alternative embodiment of the invention to perform a subtraction operation A−B, where B is a number represented by any one of its possible valid signed-digit redundant representations. In order to perform the subtraction operation, all but the least significant signed-bit is negated, and each of the resulting sign-bits is ANDed with its respective magnitude-bit and then, all but the least significant result is negated. Finally, only the least significant magnitude-bit is negated. Thus the complemented carry bits and sum bits in a redundant representation of B are generated and supplied to the carry-save adder. Then a result is corrected by adding an adjustment of three. This is performed in FIG. 16b, by setting three carry bits, $C_{A-1}$, $C_{B-1}$ and $C_{in}$ to a logic value of 1. When the combination of these three carry bits are received at the inputs provided in the carry-save adder circuit at, input 1601, input 1602 and input 1603, they are incorporated into the result. Thus the circuit configured as shown in FIG. 116b, produces a valid redundant representation for the subtraction operation A−B.

It should be apparent that the methods herein disclosed can be modified in arrangement and detail by those skilled in the art without departing from the principles of the present invention.

Figure 17:
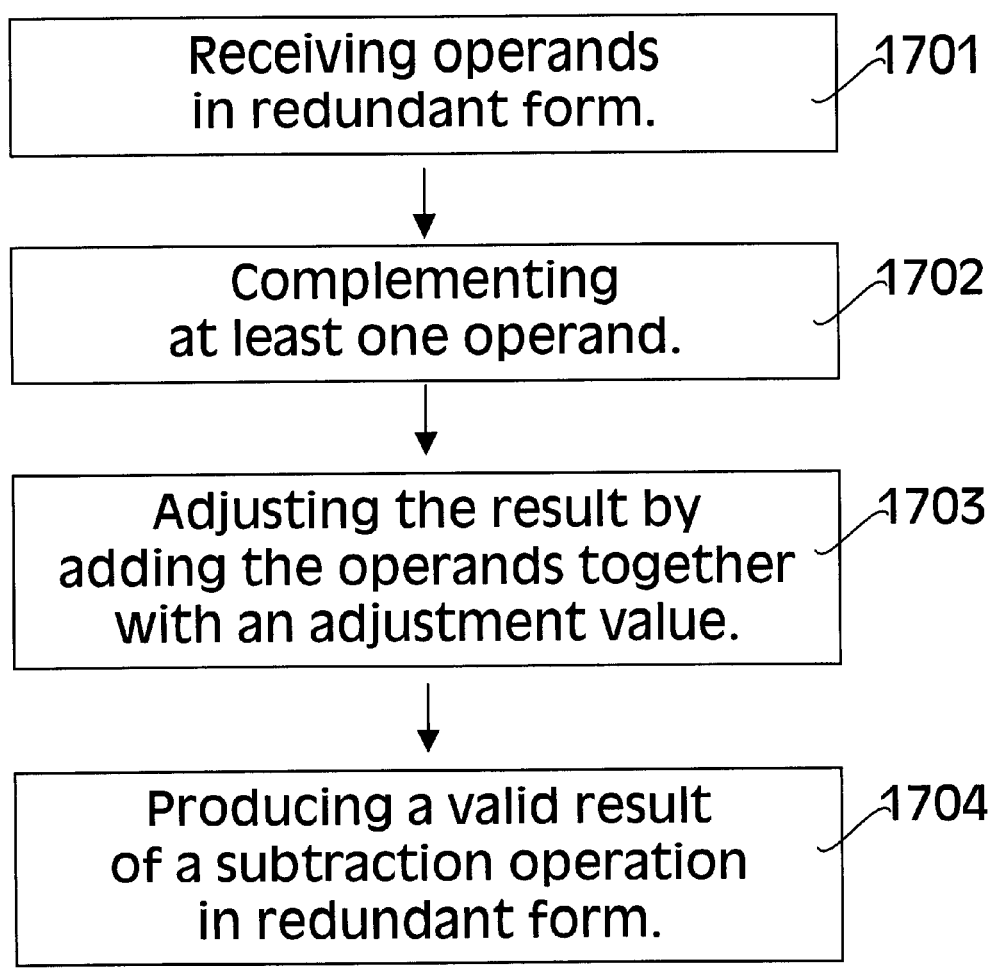
FIG. 17 shows a method for performing subtraction in redundant form arithmetic.

FIG. 17 summarizes the method for subtracting numbers represented in redundant form. The method comprises complementing, in 1702, at least one of the operands received in redundant form, in 1701; and adjusting a result produced by adding an adjustment value, in 1703, to produce a valid outcome of a subtraction operation, in 1704, represented in redundant form. As was discussed previously, and adjustment value that is a multiple of three will produce valid outcomes using carry save arithmetic and redundant digits having one carry bit and one sum bit.

In order to compare results produced in redundant form quickly, it is desirable to make use of a non-propagative comparator so that the result can be obtained prior to carry propagation. Cortadella et al. have described an equality comparison circuit for use with two's complement arithmetic in an article entitled, "Evaluation of A+B=K Conditions Without Carry Propagation," found in IEEE Transactions on Computers, vol. 41, No. 11, November 1992. A similar circuit can be used to compare results in redundant form.

Figure 18A:
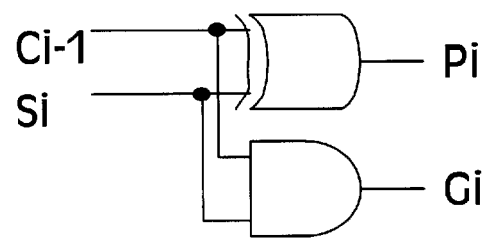
FIG. 18a shows one possible way that a carry-propagate signal and a carry-generate signal can be generated inside an adder/carry logic circuit for use with numbers in carry-sum redundant form.

FIG. 18a shows a half adder with inputs of a sum-bit and a carry-bit to be added together. This is one way that a carry-propagate signal and a carry-generate signal can be generated inside an adder/carry logic circuit for use with numbers in carry-sum redundant form.

Figure 18B:
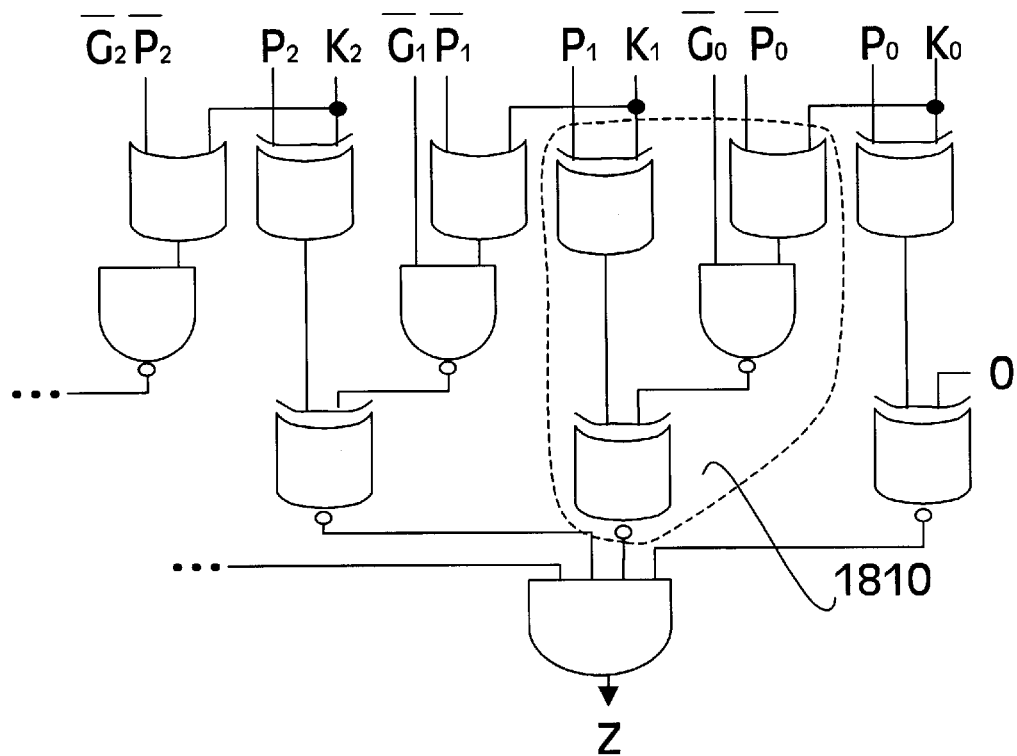
FIG. 18b shows one possible circuit for generating an equality comparison result using carry-propagate signals and carry-generate signals without requiring carry propagation.

FIG. 18b shows one possible circuit for generating an equality comparison result using carry-propagate signals and carry-generate signals without requiring carry propagation. The circuit 1810 produces an equality comparison for digit one of the redundant representation to digit one of a number K. Likewise, similar circuits produce results for each digit position. The final comparison result is collected into Z, without need for carry propagation.

Figure 19A:
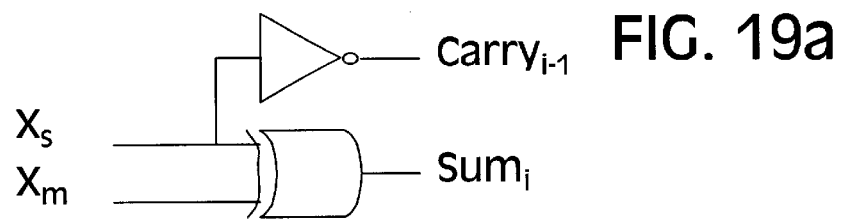
FIG. 19a shows one possible circuit for generating carry-sum inputs for the circuit of FIG. 18a from a number represented in signed-digit redundant form.

FIG. 19a shows another circuit for generating a carry-sum representation from a signed-digit representation. The values produced are suitable inputs for the circuit of FIG. 18a. Therefore the circuit of FIG. 18b can also be used if the result to be compared is in a sign-digit redundant representation.

Figure 19B:
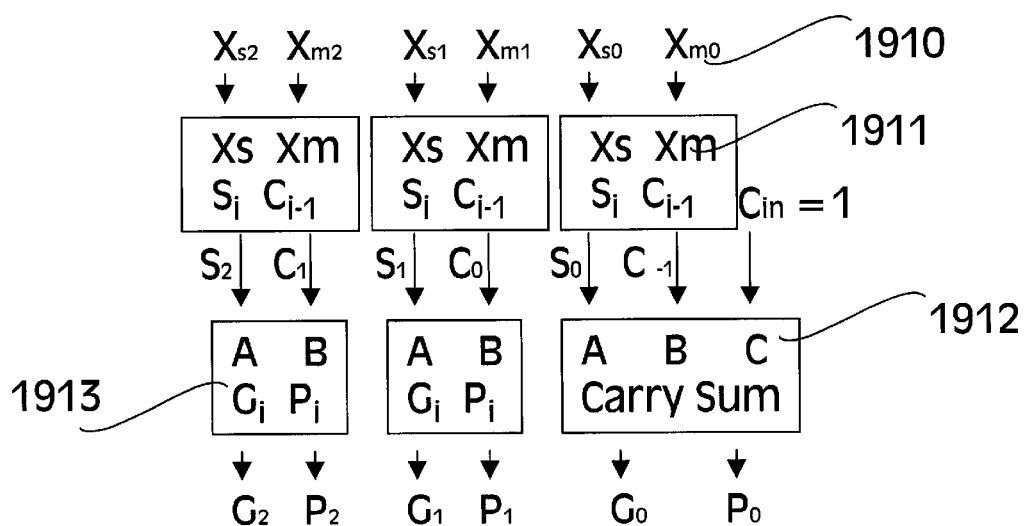
FIG. 19b shows one possible way that a carry-propagate signal and a carry-generate signal can be generated inside an adder/carry logic circuit for use with numbers in signed-digit redundant form.

FIG. 19b shows a circuit that could be part of an adder/carry logic circuit generating a carry-propagate signal and a carry-generate signal suitable for use with the non-propagative comparator circuit of FIG. 18b. The sign and magnitude values at a digit such as 1910 are input to a circuit 1911, which is similar the one shown in FIG. 19a. The results are combined using 3:2 compressor circuitry 1912 and half adder circuitry 1913 to produce carry-generate and carry-propagate signals suitable for use with the non-propagative comparator circuit of FIG. 18b.

Figure 20:
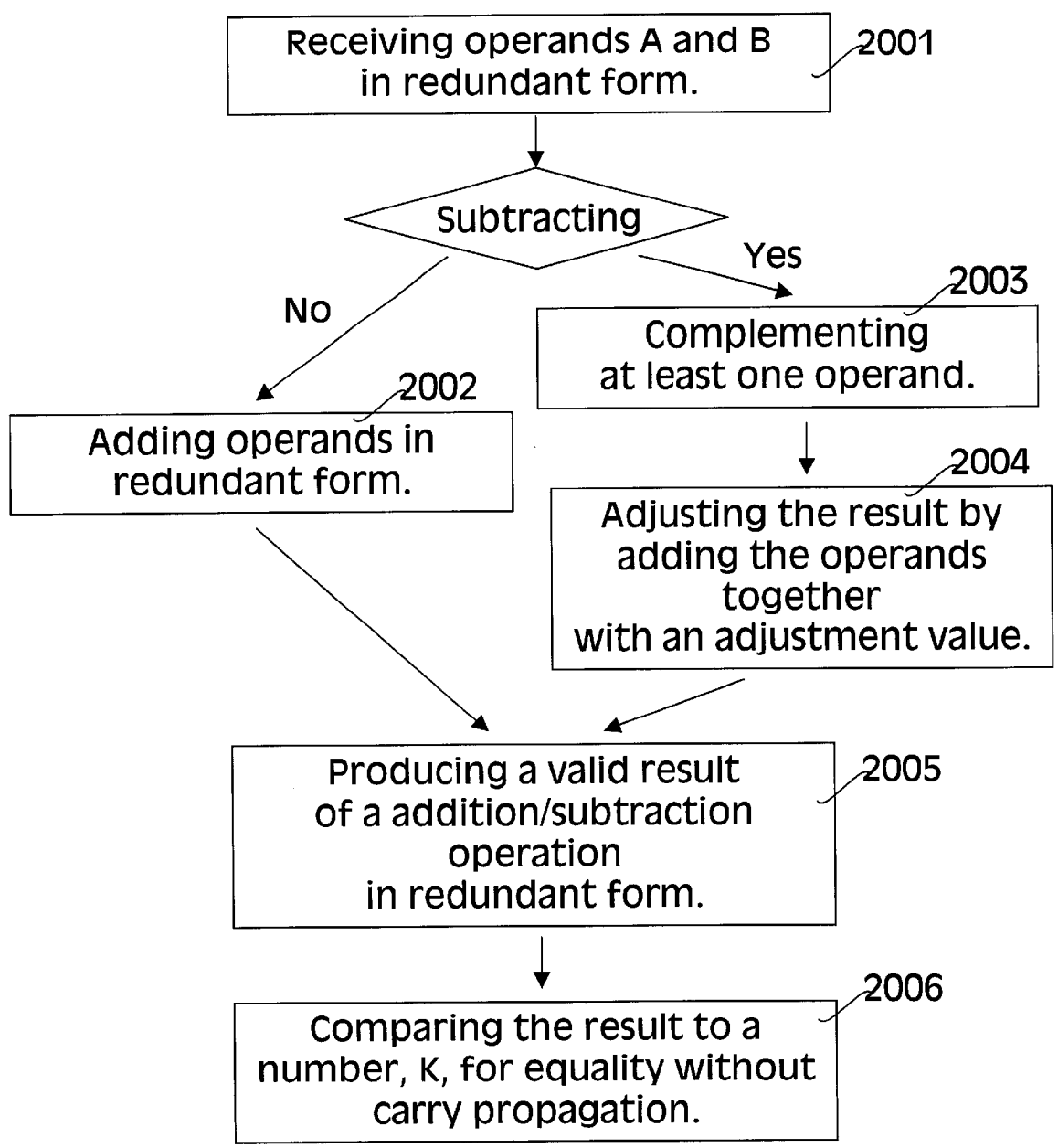
FIG. 20 shows a method for performing an addition or a subtraction in redundant form arithmetic and also performing an equality comparison without carry propagation for any of the operations.

FIG. 20 shows a method for performing an addition or a subtraction in redundant form arithmetic, thereby producing a valid result in redundant form, and also performing an equality comparison without carry propagation for any of the required operations.

Figure 21A:
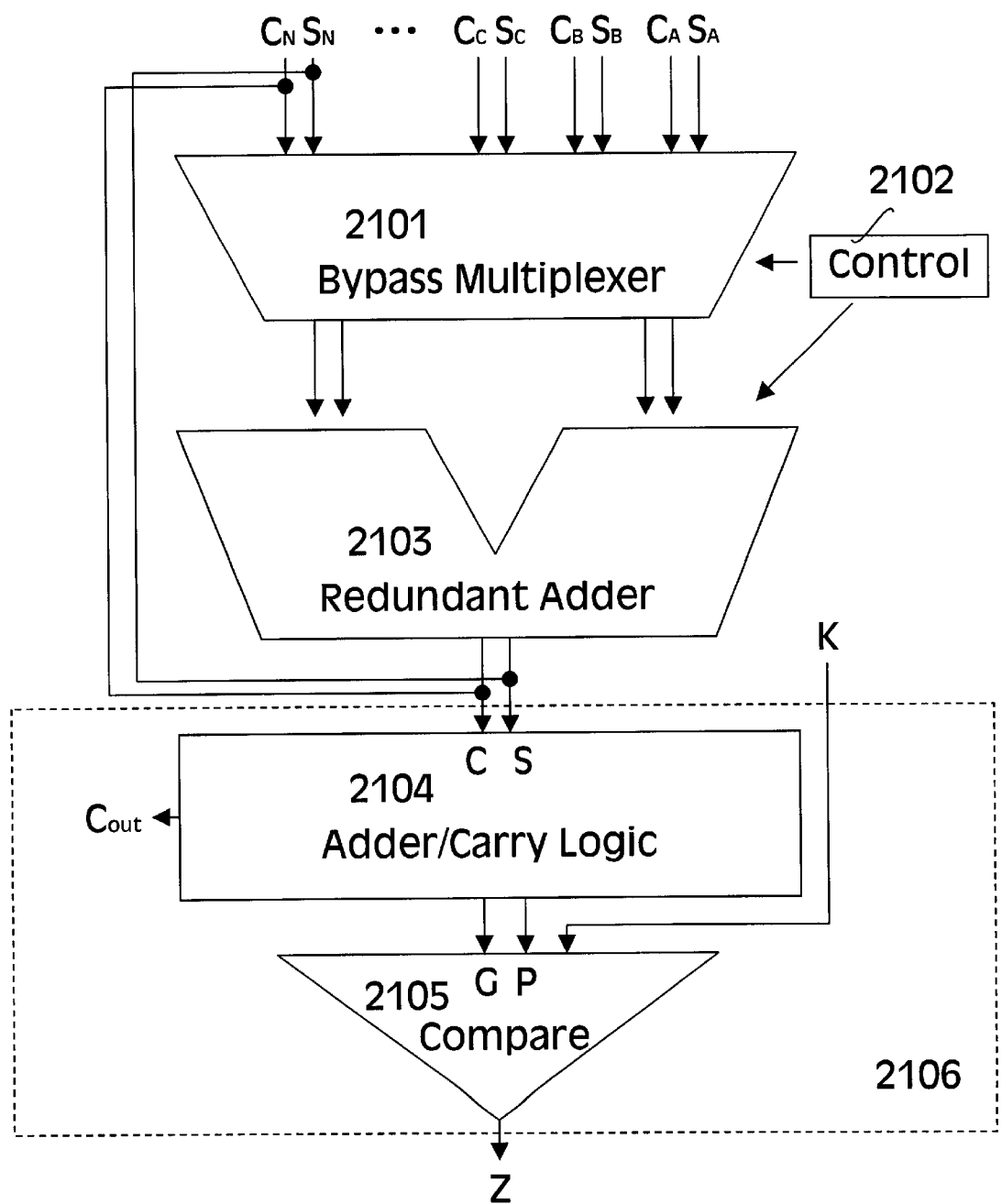
FIG. 21a shows one embodiment of a circuit with a redundant adder being used to perform addition or subtraction on operands received in a carry-sum redundant form, the operands possibly bypassed from similar or dissimilar circuits, and also with compare logic, similar to that shown in FIG. 18b, being used to perform an equality comparison without requiring carry propagation.

FIG. 21a shows one embodiment of a circuit, which can implement the method described in FIG. 20 with a redundant adder 2103 being used to perform addition or subtraction on operands received in a carry-sum redundant form and with input from control 2102 in accordance with the current method. The operands are possibly bypassed through bypass multiplexer 2101 from similar or dissimilar circuits. FIG. 21a further shows the current method implemented with a non-propagative comparator 2106 comprising adder/carry logic 2104 and compare logic 2105. The compare logic 2105 is similar to that shown in FIG. 18b, and is being used to perform an equality comparison without requiring carry propagation. As shown in FIG. 18a, the necessary carry-generate and carry-propagate signals can be generated from the redundant result by adder/carry logic 2104 without need for carry propagation.

Figure 21B:
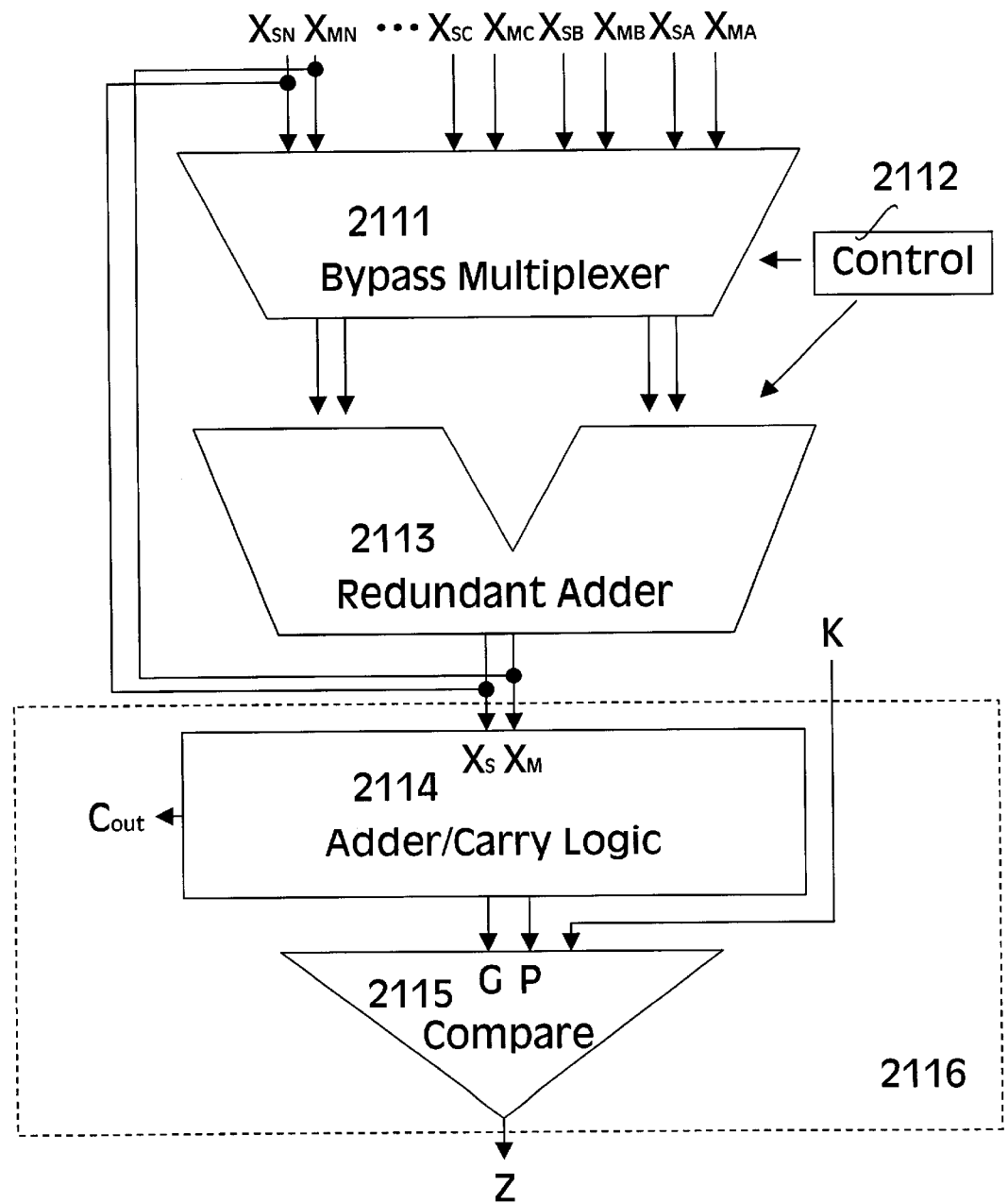
FIG. 21b shows another embodiment of a circuit with a redundant adder being used to perform addition or subtraction on operands received in a signed-digit redundant form, the operands possibly bypassed from similar or dissimilar circuits, and also with compare logic, similar to that shown in FIG. 18b, being used to perform an equality comparison without requiring carry propagation.

FIG. 21b shows another embodiment of a circuit, which can implement the method described in FIG. 20 with a redundant adder 2113 being used to perform addition or subtraction, this time on operands received in a signed-digit redundant form and with input from control 2112 in accordance with the current method. The operands are possibly bypassed through bypass multiplexer 2111 from similar or dissimilar circuits. FIG. 21b further shows the current method implemented with a non-propagative comparator 2116 comprising adder/carry logic 2114 and compare logic 2115. The compare logic is similar to that shown in FIG. 18b, and is being used to perform an equality comparison without requiring carry propagation. As shown in FIG. 19b, the necessary carry-generate and carry-propagate signals can be provided from the redundant result by adder/carry logic 2114, also without need for carry propagation.

Thus what has been disclosed enables performing, at very high computation rates, efficient bypassing of operands in redundant form for operations including addition, subtraction and equality comparisons of redundant arithmetic results to another number provided to the comparator.

What is also desirable is a method by which to make equality comparisons when any or all of the numbers to be compared are in redundant form.

FIG. 22a again shows all of the valid 3-digit representations using a redundant form with a carry bit and a sum bit for each binary digit of the number zero. Displayed next to each representation is a Boolean expression with the variables replaced by the binary values corresponding to a particular redundant representation of zero. The Boolean operations are evaluated to illustrate the purpose of the expression, the central most value corresponding to a comparison to a zero digit. Thus the expression is evaluated at line 2200 to illustrate XOR($S_2$, $C_1$)=0, OR($S_1$, $C_0$)=0, and XOR(XOR($S_2$, $C_1$), OR($S_1$, $C_0$))=0 for the corresponding representation of zero having $S_2$, $C_1$, $S_1$, and $C_0$ equal to 0,0,0, and 0 respectively. Likewise, the expression is evaluated at line 2201 to illustrate XOR($S_2$, $C_1$)=1, OR($S_1$, $C_0$)=1, and XOR(XOR($S_2$, $C_1$), OR($S_1$, $C_0$))=0 for the corresponding representation of zero having $S_2$, $C_1$, $S_1$, and $C_0$ equal to 1,0,1, and 1 respectively. At each line, 2200, 2201, 2202, 2203, and then again at lines 2204, 2205, 2206 and 2207 the expression is evaluated for a different possible internal digit of the redundant representation of zero. The central values in the table at each line show that for the redundant representations of zero, every valid internal digit representation evaluates to zero under the Boolean expression presented. Thus the Boolean expression provides a method to check a redundant representation for equality to zero by checking each bit. More importantly, the expression is not recursive, and therefore does not require carry propagation.

Figures 22A, 22B:
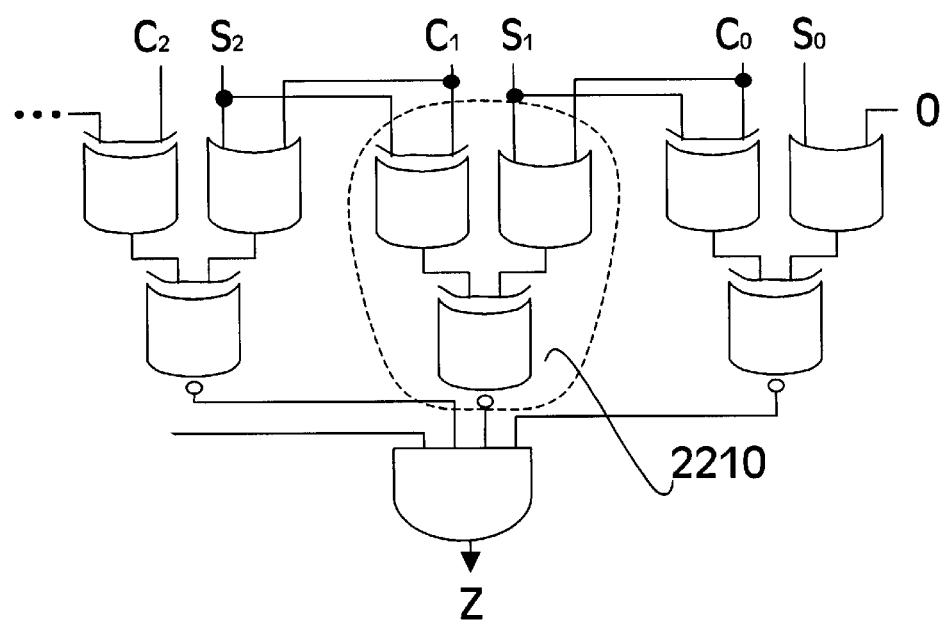
FIG. 22a shows all of the valid 3-digit representations using a redundant form with a carry bit and a sum bit for each binary digit of the number zero and next to each representation a Boolean expression is evaluated, the central most value corresponding to a comparison to a zero digit.
FIG. 22b shows one embodiment of a non-propagative circuit for comparing a number to zero, the number represented in a redundant form with a carry bit and a sum bit for each binary digit.

The expression of FIG. 22a is realized in the circuit of FIG. 22b. One embodiment of a non-propagative circuit for comparing a number to zero uses the circuit 2210 to implement the Boolean expression of FIG. 22a for a number represented in a redundant form with a carry bit and a sum bit for each binary digit. The output at each digit is negated and the results are ANDed together to indicate an equality with zero by a corresponding TRUE (1) value. The circuit shown provides the capability of determining equality or inequality before identification of the number's sign, or propagation of carry signals to the number's most significant position can be completed.

Referring for a moment to FIG. 9b, it should be clear that the Boolean expression shown in FIG. 22a can also be used to recognize redundant representations of −3 since a redundant representation for −3 is a bitwise negation of a redundant representation for zero. Therefore the circuit of FIG. 22b, with modifications to support recognizing 3 could also be used to determine equality comparisons if a result produced by subtraction was not augmented according to the method previously disclosed but produced by adding a complemented redundant form of a number without a correction value. More generally, selecting a correction value other than 3 (2 or even 0 for example) to produce a redundant form result having an expected value in cases of equality, that value being something other than zero (−1 or −3 respectively in these examples) and also using a non-propagative circuit to compare the result to the expected value does not depart from the principles of the present invention within the scope of the accompanying claims.

Figure 22C:
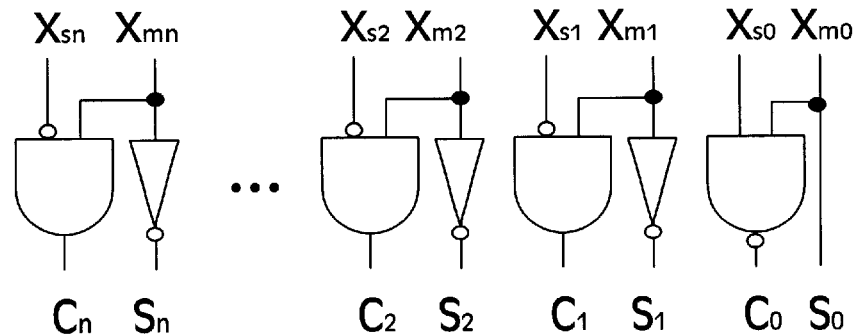
FIG. 22c shows one possible circuit for converting a number from a redundant form with a sign bit and a magnitude bit for each binary digit of the number to a redundant form with a carry bit and a sum bit for each binary digit of the number.

FIG. 22c shows a circuit for converting a number from a redundant form with a sign bit and a magnitude bit for each binary digit of the number to a redundant form with a carry bit and a sum bit for each binary digit of the number. Thus performing such a transformation, permits the circuit of FIG. 22b to be used to check signed-digit numbers for equality to zero.

Figure 22D:
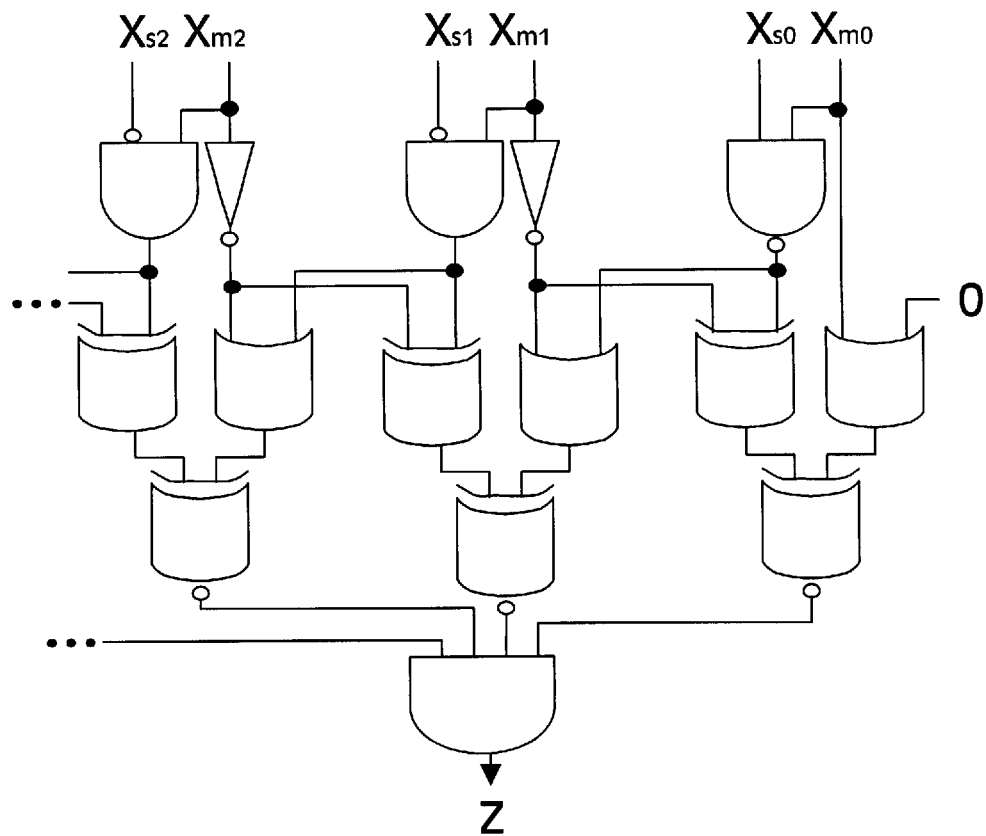
FIG. 22d shows another embodiment of a non-propagative circuit for comparing a number to zero, this number represented in a redundant form with a sign bit and a magnitude bit for each binary digit.

FIG. 22d shows another embodiment of a non-propagative circuit for comparing a number to zero, this number represented in a redundant form with a sign bit and a magnitude bit for each binary digit. Thus the circuit can be adapted to use with signed-digit adders producing results in a signed-digit redundant form. It should be apparent that the circuit can be modified in arrangement and detail by those skilled in the art without departing from the principles of the present invention.

Figure 23:
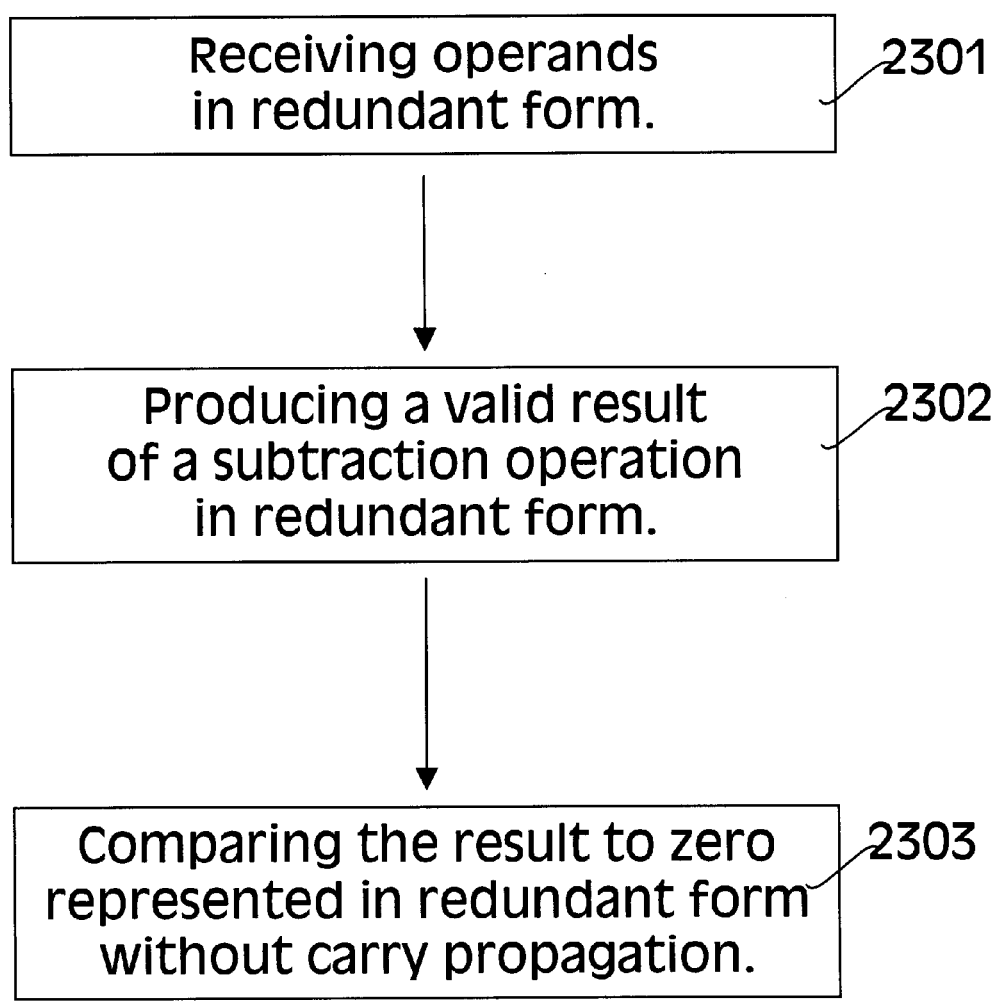
FIG. 23 shows a method for performing an equality comparison on operands received in redundant form without carry propagation for any of the operations.

FIG. 23 shows a method for performing an equality comparison on operands received in redundant form without carry propagation for any of the operations. The method comprises receiving operands in redundant form at stage 2301, producing a valid result of a subtraction operation in redundant form at stage 2302, and comparing the result to zero represented in redundant form without carry propagation.

Figure 24:
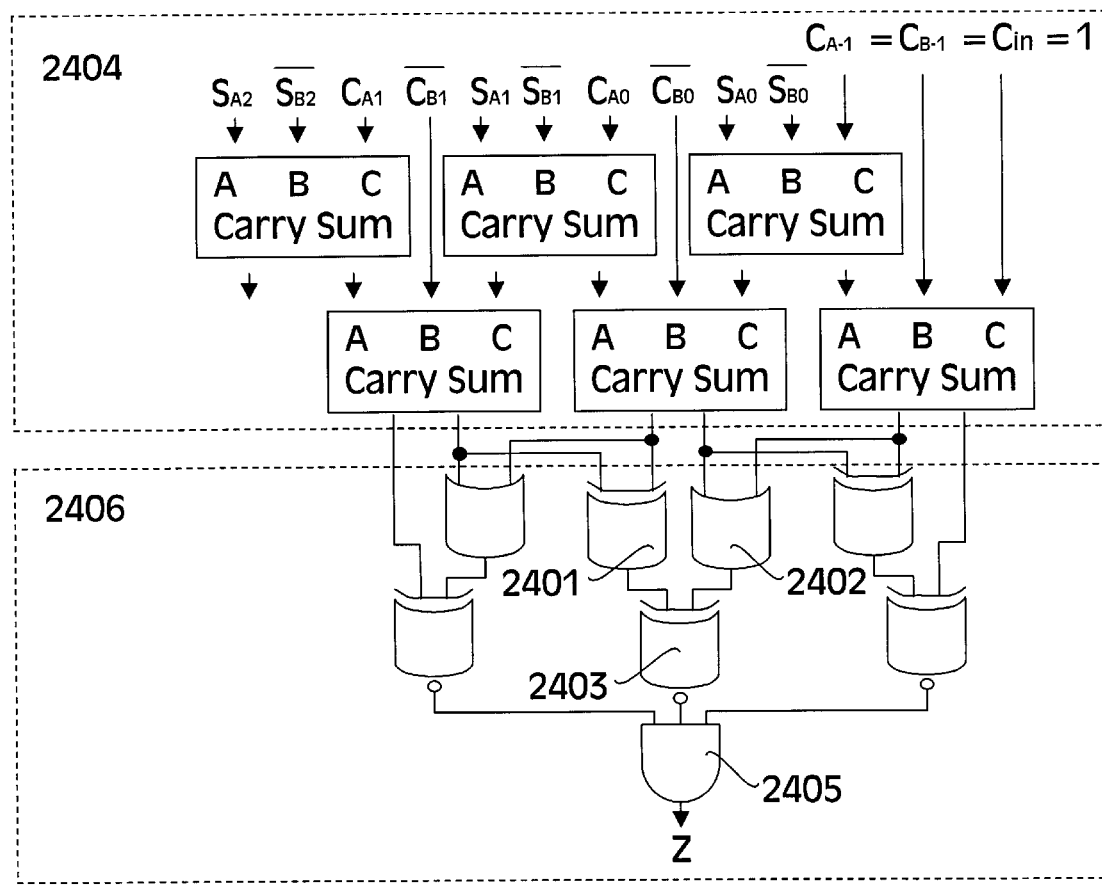
FIG. 24 shows one embodiment of an equality comparison with a redundant adder being used to perform subtraction on operands received in redundant form and a circuit for comparing the result to zero in redundant form without requiring carry propagation.

FIG. 24 shows one embodiment of an equality comparison with a redundant adder, 2404, being used to perform subtraction on operands received in redundant form and a circuit, 2406, for comparing the result to zero in redundant form without requiring carry propagation. The circuit, 2406, is made up of smaller circuits, one for checking each digit of a redundant result. The internal smaller circuits correspond to the function described by the Boolean expression of FIG. 22a. For example, at digit one of the redundant result, the expression is realized by gate 2401, which performs XOR($S_2$, $C_1$); gate 2402, which performs OR($S_1$, $C_0$); and gate 2403 which performs XNOR(XOR($S_2$, $C_1$), OR($S_1$, $C_0$)) thereby evaluating the expression as shown in FIG. 22a and also negating the result to be ANDed together with results from other digits by gate 2405.

Figure 25A:
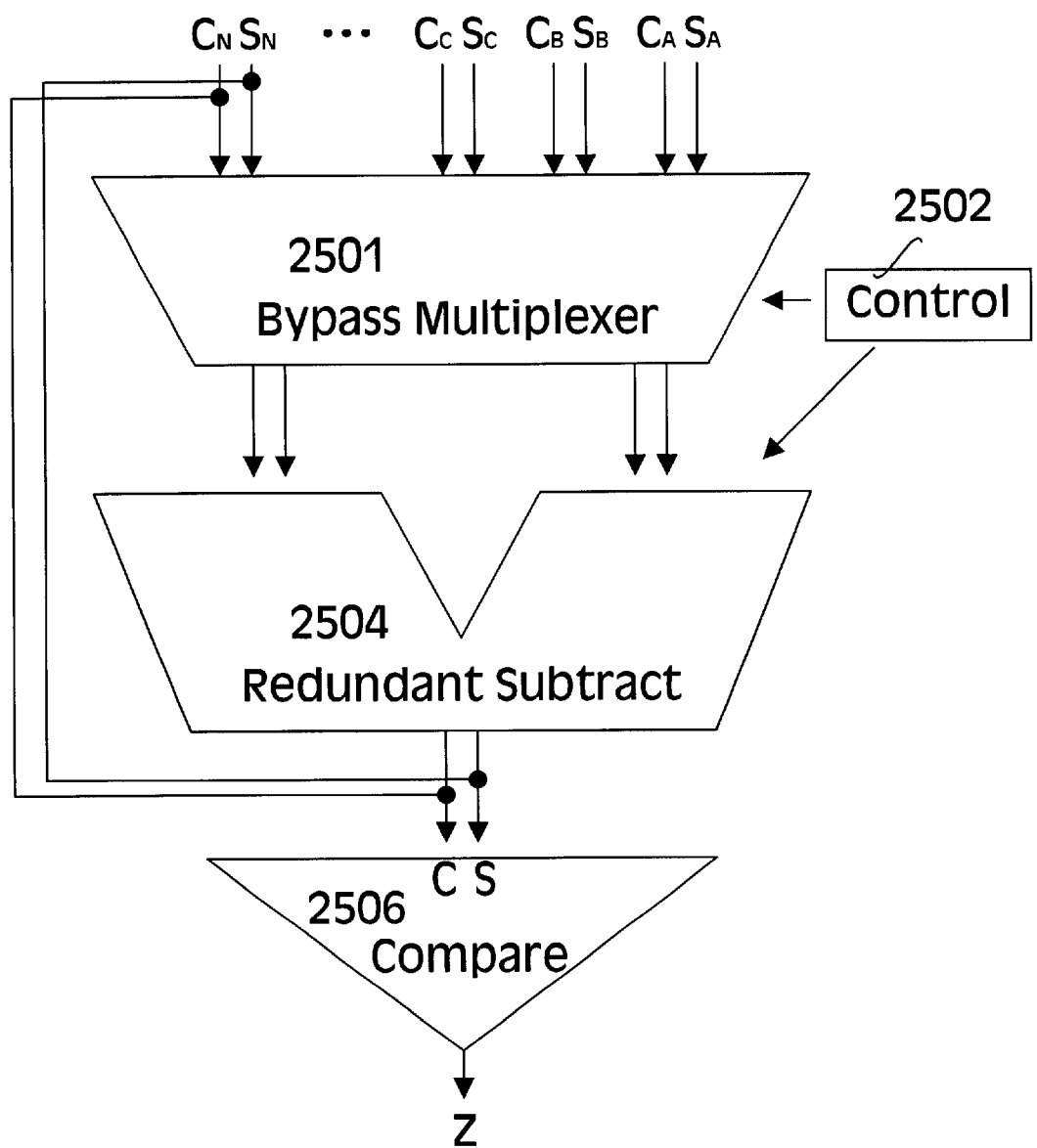
FIG. 25a shows another embodiment of an equality comparison with a redundant adder being used to perform subtraction on operands received in a redundant form with a carry bit and a sum bit for each binary digit, the operands possibly being bypassed from similar or dissimilar circuits, and with a circuit for comparing the result to zero in redundant form without requiring carry propagation.

FIG. 25a shows another embodiment of an equality comparison with a redundant adder, 2504, being used to perform subtraction on operands received in a redundant form with a carry bit and a sum bit for each binary digit. The operands can be bypassed from similar or dissimilar circuits through bypass multiplexer 2501. Control unit 2502 can provide signals to cause a complemented form of at least one operand to be generated and an adjustment value to be added together with the operands to produce a valid result in redundant form of a subtraction operation. A circuit 2506 is provided for comparing the result to zero in redundant form without requiring carry propagation.

Figure 25B:
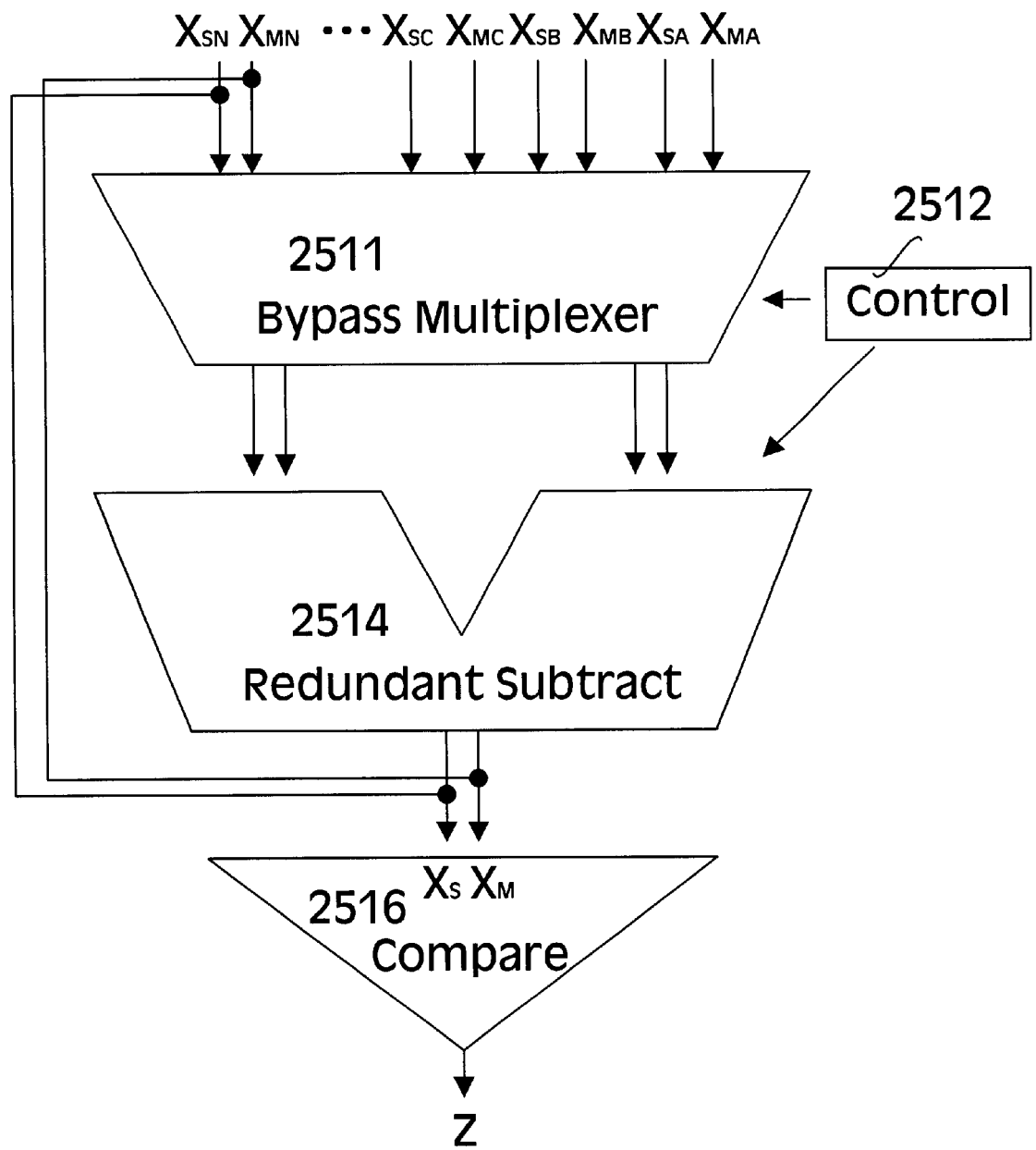
FIG. 25b shows another embodiment of an equality comparison with a redundant adder being used to perform subtraction on operands received in a redundant form with a sign bit and a magnitude bit for each binary digit, the operands possibly being bypassed from similar or dissimilar circuits, and with a circuit for comparing the result to zero in redundant form without requiring carry propagation.

FIG. 25b shows a third embodiment of an equality comparison with a redundant adder, 2514, being used to perform subtraction on operands received in a redundant form with a sign bit and a magnitude bit for each binary digit. The operands are possibly bypassed from similar or dissimilar circuits through bypass multiplexer, 2511. Control unit 2512 can provide signals to effect a subtraction either by causing a complemented form of at least one operand to be generated and an adjustment value to be added together with the operands to produce a valid result in redundant form of a subtraction operation, or by causing sign-bits to be complemented without causing an adjustment value to be added, or by some other means. A circuit, 2516, is provided according to the methods disclosed for comparing the result to zero in redundant form without requiring carry propagation.

Figure 26:
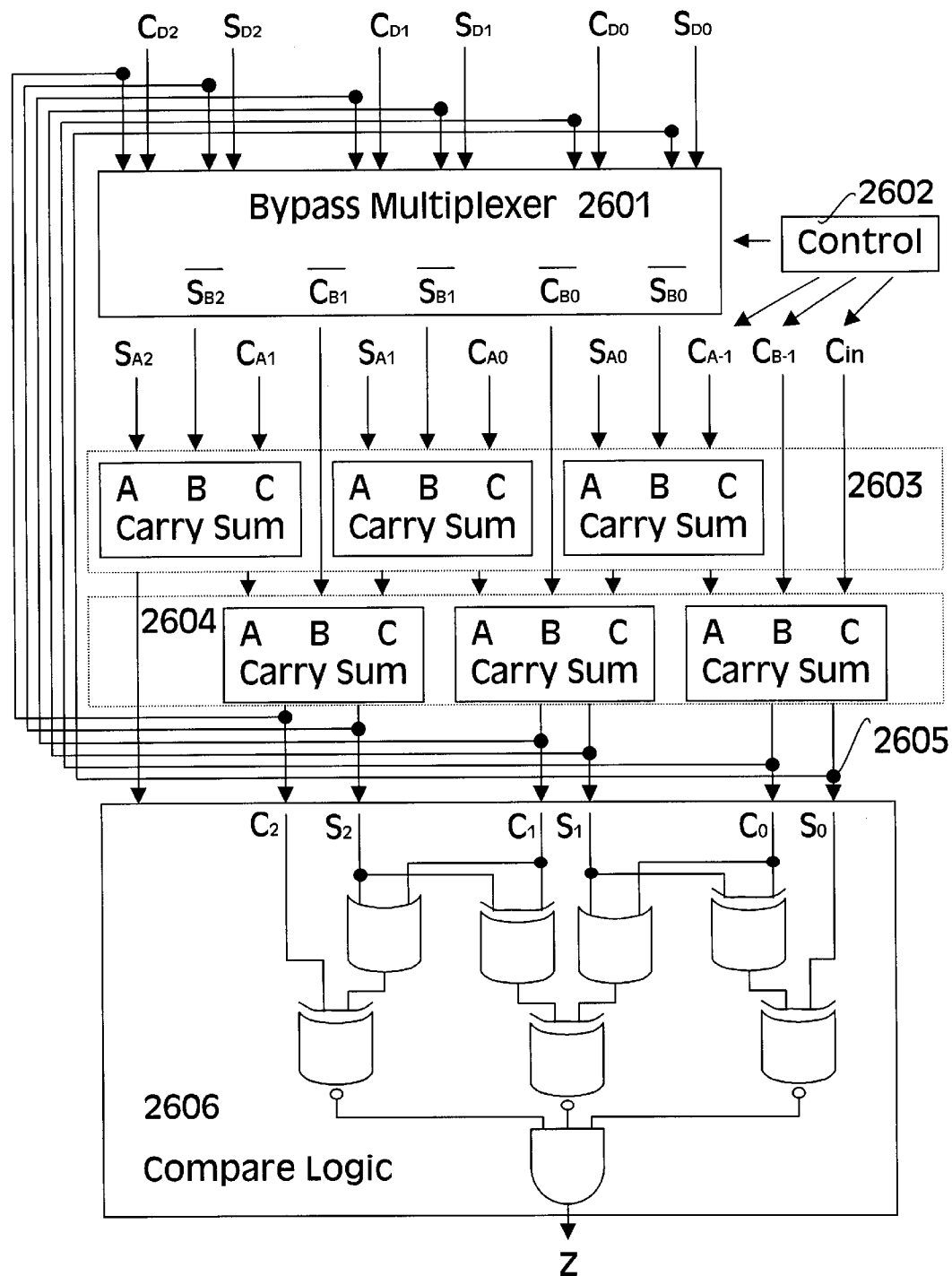
FIG. 26 shows another embodiment of an equality comparison with a redundant adder being used to perform subtraction on operands received in redundant form with a carry bit and a sum bit for each binary digit, the operands possibly being bypassed from similar or dissimilar circuits, and with a circuit for comparing the result to zero in redundant form without requiring carry propagation.

FIG. 26 shows a fourth embodiment of an equality comparison with a redundant adder with two stages 2603, and 2604, being used to perform subtraction on operands received in a redundant form with a carry bit and a sum bit for each binary digit. The operands are possibly bypassed from similar or dissimilar circuits through bypass multiplexer 2601. Control unit 2602, can cause a complemented form of at least one operand to be generated in redundant form and an adjustment value to be added together with the operands to produce a valid result of a subtraction operation in redundant form. A circuit, 2606, is provided in accordance with the methods disclosed for comparing the result to zero in redundant form without requiring carry propagation.

Thus what has most recently been disclosed enables performing, at very high computation rates, efficient bypassing of operands in redundant form for operations including addition, subtraction, equality comparisons and comparisons of redundant arithmetic results to zero where any or all of the operands are received in redundant form.

What is also desirable to accomplish is a method and apparatus to evaluate A+B=K conditions without carry propagation where any or all of the operands, A, B and K are in redundant form.

Figure 27A:
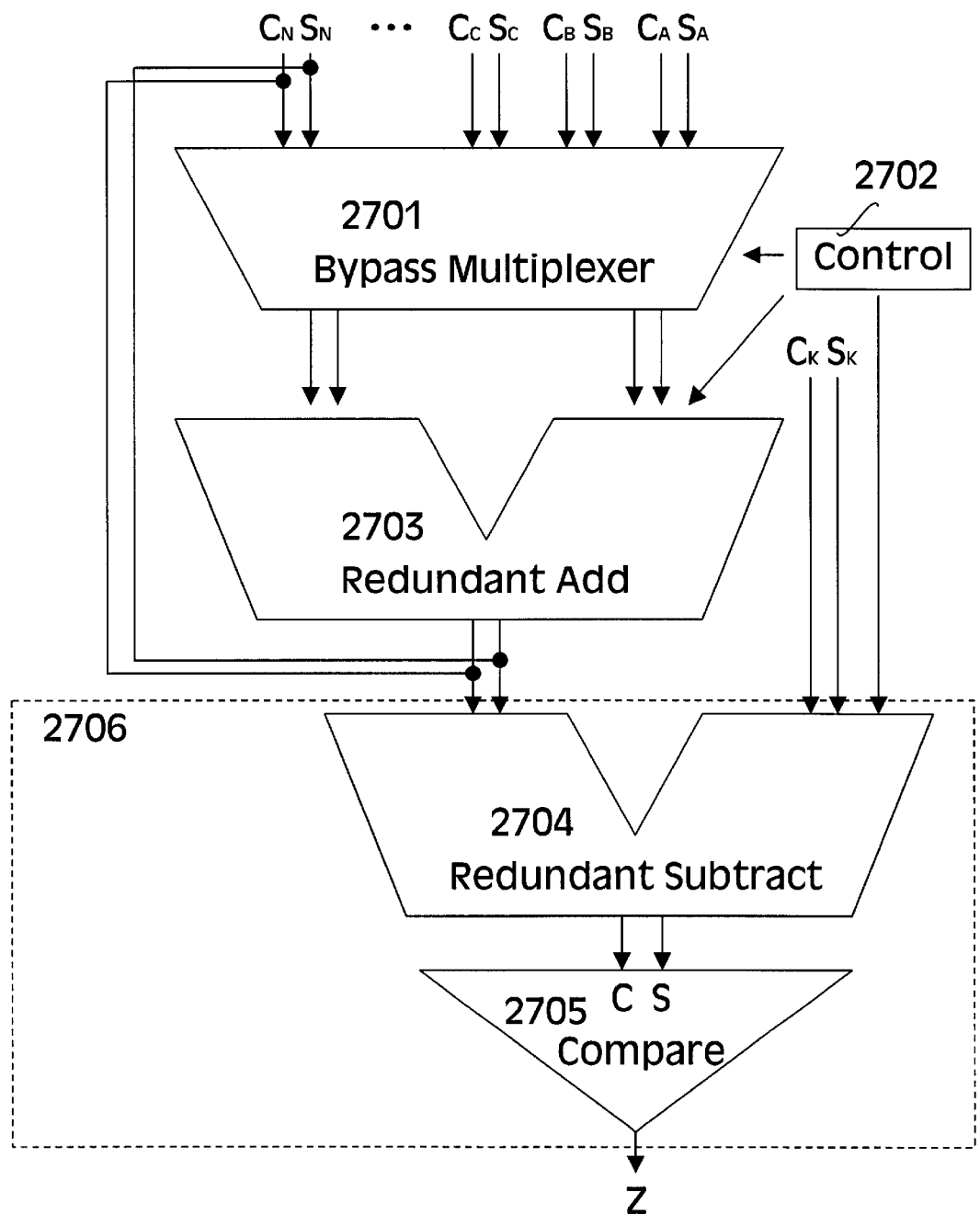
FIG. 27a shows one embodiment of a circuit for evaluation of A+B=K conditions with a redundant adder being used to perform addition on A and B operands received in a carry-sum redundant form, with a redundant adder being used to perform subtraction on the sum and K operand in carry-sum redundant form, the operands possibly bypassed from similar or dissimilar circuits, and also with compare logic, being used to perform an equality comparison without requiring carry propagation.

FIG. 27a shows one embodiment of a circuit for evaluation of A+B=K conditions with a redundant adder/subtractor, 2703, being used to perform addition of A and B operands received in a carry-sum redundant form. A second redundant adder/subtractor, 2704, is being used to perform subtraction of the sum and K operand in carry-sum redundant form. The operands are possibly bypassed from similar or dissimilar circuits through bypass multiplexer 2701.

Control unit, 2702, can provide signals to cause redundant adder/subtractors, 2703 and 2704, to perform additions or subtractions. Comparator, 2706, can perform equality comparisons in accord with the method of FIG. 23 without requiring carry propagation. It comprises redundant adder/subtractor, 2704, and compare logic, 2705, which is being used to compare a result of a subtraction to zero represented in redundant form without requiring carry propagation.

Figure 27B:
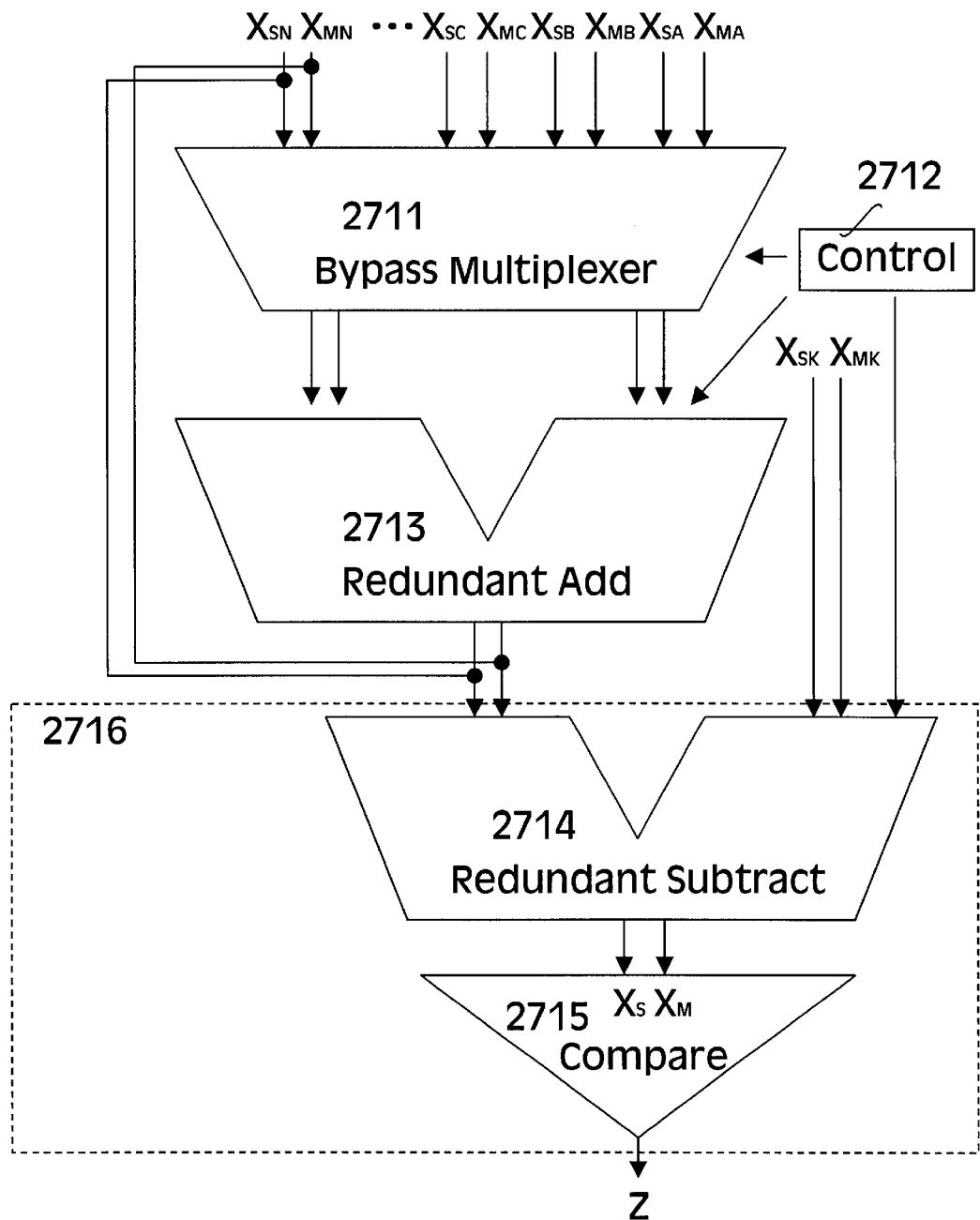
FIG. 27b shows another embodiment of a circuit for evaluation of A+B=K conditions with a redundant adder being used to perform addition on A and B operands received in a signed-digit redundant form, with a redundant adder being used to perform subtraction on the sum and K operand in signed-digit redundant form, the operands possibly bypassed from similar or dissimilar circuits, and also with compare logic, being used to perform an equality comparison without requiring carry propagation.

FIG. 27b shows another embodiment of a circuit for evaluation of A+B=K conditions with a redundant adder/subtractor, 2713, being used to perform addition of A and B operands received in a signed-digit redundant form. A second redundant adder/subtractor, 2714, is being used to perform subtraction of the sum and K operand in signed-digit redundant form. The operands are possibly bypassed from similar or dissimilar circuits through bypass multiplexer 2711. Control unit, 2712, can provide signals to cause redundant adder/subtractors, 2713 and 2714, to perform additions or subtractions. Comparator, 2716, can perform equality comparisons in accord with the method of FIG. 23 without requiring carry propagation. It comprises redundant adder/subtractor, 2714, and compare logic, 2715, which is being used to compare a result of a subtraction to zero represented in redundant form without requiring carry propagation.

Figure 28:
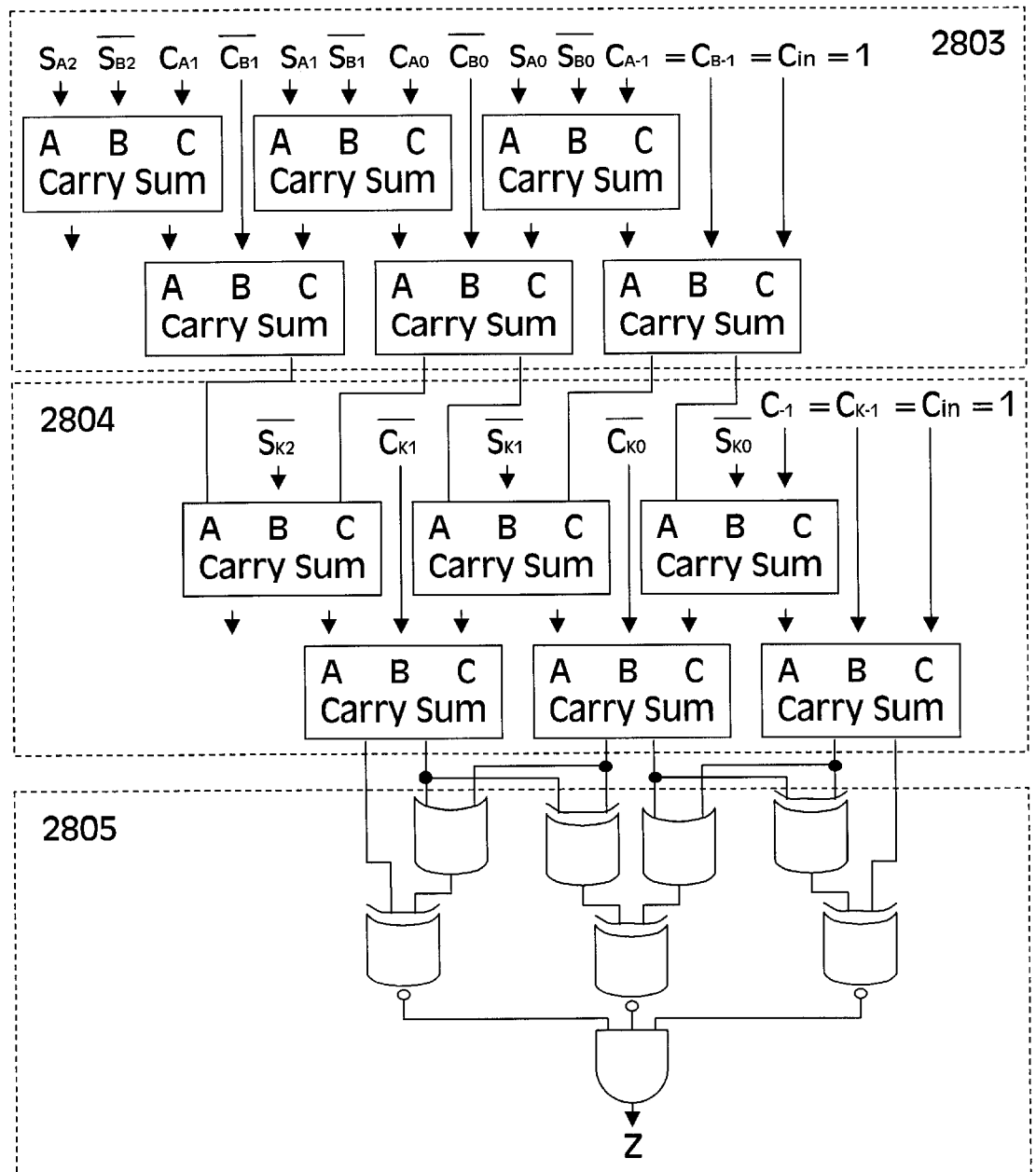
FIG. 28 shows one embodiment of a circuit for evaluation of A−B=K conditions with a redundant adder being used to perform subtraction on A and B operands received in a carry-sum redundant form, with a redundant adder being used to perform subtraction on the difference and the K operand in carry-sum redundant form, the operands possibly bypassed from similar or dissimilar circuits, and also with compare logic, being used to perform an equality comparison without requiring carry propagation.

FIG. 28 shows another embodiment of a circuit for evaluation of A−B=K conditions with a redundant adder/subtractor, 2803, being used to perform subtraction of A and B operands received in a carry-sum redundant form. A redundant adder/subtractor, 2804, is being used to perform subtraction of the difference and the K operand in carry-sum redundant form. Compare logic, 2805, is being used to perform an equality comparison without requiring carry propagation.

Figure 29:
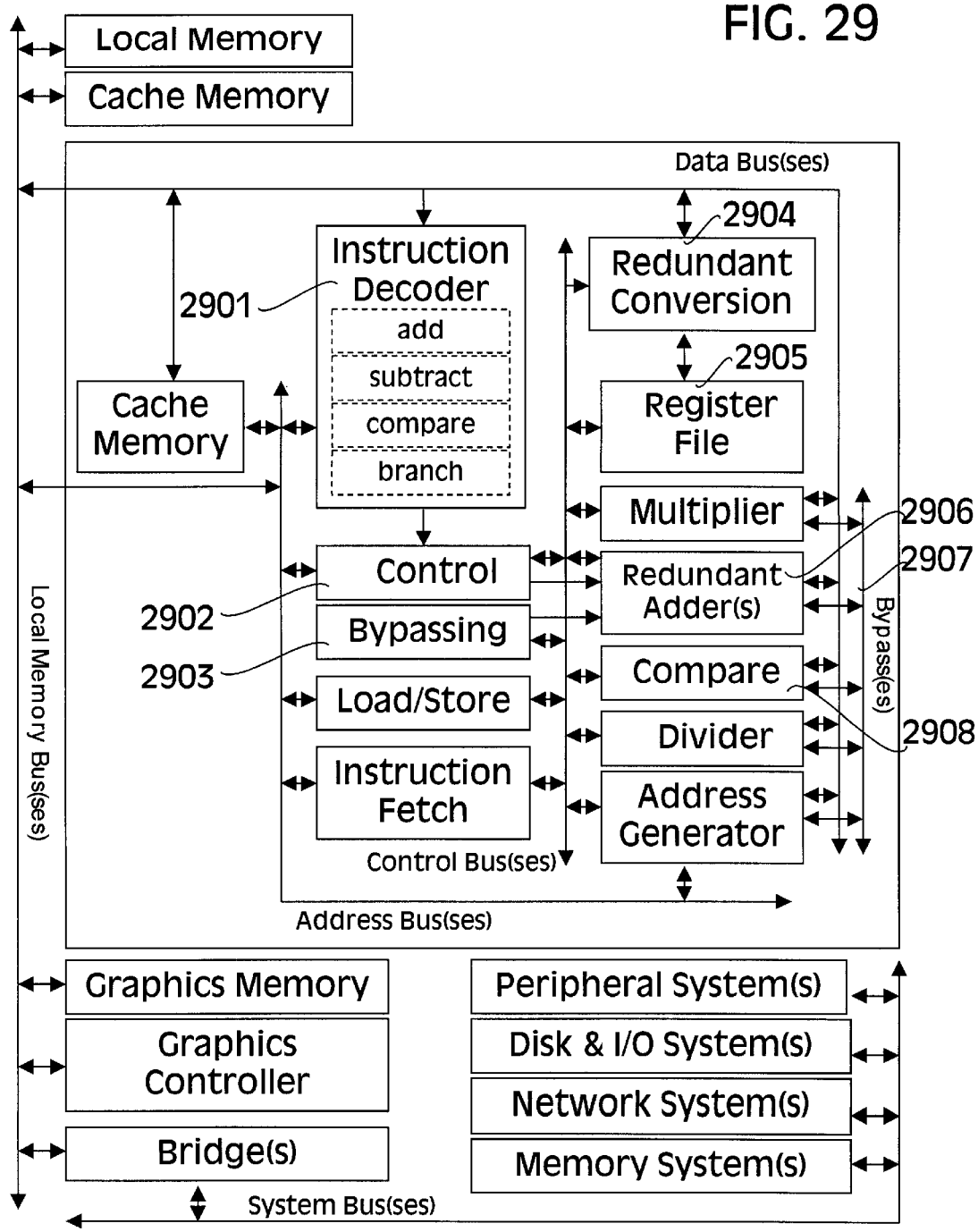
FIG. 29 shows one embodiment of a digital system comprising bypass circuitry, redundant arithmetic circuitry and comparison circuitry adapted to perform additions, subtractions and non-propagative comparisons in accordance with the methods and teachings of the present invention.

FIG. 29 shows another alternate embodiment of the invention employed in a digital computing system. The instruction decoder, 2901, is capable of decoding instructions including but not limited to addition instructions, subtraction instructions, compare instructions and branch instructions. Many of the digital functions may be implemented with redundant form arithmetic circuitry including but not limited to multiplication, division, address generation, comparisons, addition and subtraction. In particular redundant adder, 2906, uses redundant form circuitry to perform subtraction in the manner previously disclosed. When an instruction completes, the results are converted from redundant form through redundant conversion unit, 2904, and written into register file, 2905. If a subtraction or comparison instruction requires, as an operand, a result from a previous instruction, the result may be bypassed in redundant form via bypass(es), 2907, under the direction of bypass routing control, 2903. The result may be supplied by any of the functional units that use redundant form representations. Control, 2902, directs the negation of the bypassed operand through complementing its digits and augmenting the result with a correction value supplied as input to redundant adder, 2906. Thus, results may be bypassed as operands in redundant form and valid results may be produced in redundant form for subtraction operations. Results produced by redundant arithmetic circuitry and transmitted in redundant form can be compared to zero or to some other number K in non-propagative compare circuitry 2908.

The above description is intended to illustrate preferred embodiments of the present invention. From the discussion above it should also be apparent that the invention can be modified in arrangement and detail by those skilled in the art without departing from the principles of the present invention within the scope of the accompanying claims.

What is claimed is:

1. A method comprising:

generating a complemented redundant form of at least one number of two numbers in redundant form to supply to an arithmetic circuit, and comparing a comparable result produced by the arithmetic circuit to an expected value using a non-propagative comparator to determine equality or inequality of the two numbers in redundant form.

2. The invention recited in claim 1 wherein said method further comprises:

providing input to the arithmetic circuit to augment the comparable result produced by the arithmetic circuit.

3. The invention recited in claim 2 wherein the expected value is zero (0).

4. The invention recited in claim 1 wherein the expected value is negative 3 (−3).

5. The invention recited in claim 1 wherein the comparable result produced by the arithmetic circuit represents a difference of the two numbers in redundant form.

6. A method comprising:

generating from a first number and a second number and through a first arithmetic circuit a first outcome represented in redundant form;

generating in redundant form through a second arithmetic circuit a second outcome of an arithmetic operation performed on the first outcome and a third number received in redundant form; and determining equality or inequality of the first outcome to the third number by comparing the second outcome to an expected value represented in redundant form.

7. The invention recited in claim 6 wherein equality or inequality of the first outcome and the third number is determined before a sign of said second outcome can be generated.

8. The invention recited in claim 6, said second outcome in redundant form comprising a plurality of digits ranked according to significance, wherein equality or inequality of the first outcome and the third number is determined earlier than a carry signal could be propagated from a least significant ranked digit to a most significant ranked digit of said plurality of digits.

9. The invention recited in claim 6 wherein the redundant form of the second outcome is a carry-sum redundant form.

10. An apparatus for detecting zero represented in redundant form comprising:

a first circuit having a plurality of digit comparison circuits, the first circuit to receive a number represented in redundant form having a plurality of digits ranked according to significance, and to generate a plurality of digit comparison results, each of the digit comparison results produced by a corresponding one of the plurality of digit comparison circuits and each of the digit comparison results being dependent upon inputs from one corresponding digit of a given significance but also dependent on at most one less significant digit and one more significant digit from the plurality of digits, none of the digit comparisons being dependent upon outputs produced by other digit comparison circuits;

a second circuit to receive the plurality of digit comparison results from the first circuit and to combine the digit comparison results to produce a consensus indicating an equality relation of the number represented in redundant form to zero.

11. The invention recited in claim 10 wherein the number represented in redundant form has a plurality of digits, each digit comprising a carry bit and a sum bit.

12. The invention recited in claim 11 wherein the consensus indicating said equality relation of the number represented in redundant form to zero is determined earlier than a carry signal could be propagated from a least significant ranked digit to a most significant ranked digit of said plurality of digits.

* * * * *